(12) United States Patent
Marinier et al.

(10) Patent No.: US 9,438,330 B2
(45) Date of Patent: *Sep. 6, 2016

(54) METHODS AND APPARATUS FOR REORDERING DATA IN AN EVOLVED HIGH SPEED PACKET ACCESS SYSTEM

(71) Applicant: InterDigital Technology Corporation, Wilmington, DE (US)

(72) Inventors: Paul Marinier, Brossard (CA); Diana Pani, Montreal (CA); Christopher R. Cave, Dollard-des-Ormeaux (CA); Rocco DiGirolamo, Laval (CA); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,447

(22) Filed: Feb. 21, 2014

(65) Prior Publication Data

US 2014/0286231 A1 Sep. 25, 2014

Related U.S. Application Data

(63) Continuation of application No. 12/048,855, filed on Mar. 14, 2008, now Pat. No. 8,724,634.

(60) Provisional application No. 60/895,028, filed on Mar. 15, 2007, provisional application No. 60/895,835, (Continued)

(51) Int. Cl.
*H04L 1/00* (2006.01)
*H04B 7/155* (2006.01)
(Continued)

(52) U.S. Cl.
CPC ............. *H04B 7/155* (2013.01); *H04L 1/1841* (2013.01); *H04W 16/26* (2013.01)

(58) Field of Classification Search
CPC ........ H04L 47/34; H04L 47/35; H04L 47/36; H04L 29/06163; H04L 29/06164
USPC ........ 370/345, 347, 348, 350, 229, 230, 329, 370/330, 319, 320, 321, 394, 465
See application file for complete search history.

(56) References Cited

U.S. PATENT DOCUMENTS 8,036,169 B2 10/2011 Kuo et al.
8,208,402 B2 6/2012 Fischer et al.
(Continued)

FOREIGN PATENT DOCUMENTS

CN 1875557 A 12/2006
EP 1326388 A2 7/2003
(Continued)

OTHER PUBLICATIONS
3GPP TS 25.321 V7.3.0 (Dec. 2006).*
(Continued)

*Primary Examiner* — Dady Chery
(74) *Attorney, Agent, or Firm* — Condo Roccia Koptiw LLP

(57) ABSTRACT

Method and apparatus for receiving high speed downlink shared channel (HS-DSCH) transmissions are disclosed. An HS-DSCH medium access control (MAC-ehs) entity receives MAC-ehs protocol data units (PDUs) via a high speed downlink shared channel (HS-DSCH) while in one of Cell_FACH, Cell_PCH, and URA_PCH states. The reordering PDUs included in the MAC-ehs PDUs may be sent to a next processing entity without performing reordering of the PDUs. A certain reordering queue may enter a suspend state upon occurrence of a triggering event and MAC-ehs PDUs distributed to the reordering queue in the suspend state may be forwarded to the next processing entity without performing reordering. MAC-ehs reset procedure may be extended for a certain transmission such that the MAC-ehs reset is performed after receiving a MAC-ehs PDU in a target cell.

16 Claims, 4 Drawing Sheets

Related U.S. Application Data filed on Mar. 20, 2007, provisional application No. 60/915,023, filed on Apr. 30, 2007, provisional application No. 60/916,993, filed on May 9, 2007, provisional application No. 60/940,209, filed on May 25, 2007, provisional application No. 60/941,465, filed on Jun. 1, 2007.

(51) Int. Cl.
*H04L 1/18* (2006.01)
*H04W 16/26* (2009.01)

(56) References Cited

U.S. PATENT DOCUMENTS

| | | | |
|---|---|---|---|
| 8,340,028 B2 | 12/2012 | Ishii et al. | |
| 2003/0131124 A1 | 7/2003 | Yi et al. | |
| 2004/0037224 A1 | 2/2004 | Choi et al. | |
| 2005/0100048 A1* | 5/2005 | Chun et al. | 370/468 |
| 2005/0125125 A1 | 6/2005 | Matsumoto et al. | |
| 2005/0135329 A1 | 6/2005 | Lee et al. | |
| 2005/0266846 A1 | 12/2005 | Kim | |
| 2005/0270996 A1 | 12/2005 | Yi et al. | |
| 2005/0281232 A1 | 12/2005 | Kim et al. | |
| 2008/0123567 A1 | 5/2008 | Suzuki et al. | |
| 2008/0192688 A1* | 8/2008 | Kuo et al. | 370/329 |
| 2010/0008269 A1 | 1/2010 | Chun et al. | |

FOREIGN PATENT DOCUMENTS

| | | |
|---|---|---|
| GB | 2418569 A | 3/2006 |
| JP | 2004-007654 A | 1/2004 |
| JP | 2006-322367 A | 11/2006 |
| JP | 2008-136142 A | 6/2008 |
| JP | 2010-008269 A | 1/2010 |
| JP | 2010-514328 A | 4/2010 |
| JP | 4909418 B2 | 4/2012 |
| RU | 2005-130400 A | 6/2006 |
| TW | 2007-04253 A | 1/2007 |
| TW | 2007-09705 A | 3/2007 |
| TW | 2008-35354 A | 8/2008 |
| WO | WO 2005/046086 A1 | 5/2005 |
| WO | WO 2005/125126 A1 | 12/2005 |
| WO | WO 2005125125 A1 | 12/2005 |
| WO | WO 2006/083131 A1 | 8/2006 |
| WO | WO 2007/050231 A2 | 5/2007 |
| WO | WO 2008-084959 A2 | 7/2008 |
| WO | WO 2008/115446 A1 | 9/2008 |

OTHER PUBLICATIONS

International Patent Application No. PCT/US2008/003455: Notification of Transmittal of International Preliminary Report on Patentability dated Sep. 15, 2009, 6 pages.
International Patent Application No. PCT/US2008/003455: International Search Report dated Aug. 4, 2008, 3 pages.
International Patent Application No. PCT/US2008/003455: Written Opinion dated Aug. 4, 2008, 5 pages.
3$^{rd}$ Generation Partnership Project (3GPP), R2-070507, "Introduction of HS-DSCH reception in CELL_FACH state", Nokia, 3GPP TSG-RAN WG2 Meeting #57, St. Louis, USA, Feb. 12-16, 2007, 45 pages.
3rd Generation Partnership Project (3GPP), R2-071061, "L2 Enhancements CR to MAC", Ericsson, 3GPP TSG-RAN2 Meeting #57, St. Louis, USA, Feb. 12-16, 2007, 22 pages.
3rd Generation Partnership Project (3GPP), R2-071063, "Proposed CR to TS 25.331 [Rel-7] on Introducing Enhanced L2 in RRC Specification", Ericsson, 3GPP TSG-RAN2 Meeting #57, St. Louis, USA, Feb. 12-16, 2007, 10 pages.
3rd Generation Partnership Project (3GPP), R2-071076, "Stage 2 Updates for Enhanced CELL_FACH State in FDD", Nokia, Ericsson, 3GPP TSG-RAN WG2 Meeting #57, St. Louis, USA, Feb. 12-16, 2007, 36 pages.
3rd Generation Partnership Project (3GPP), R2-071185, "Reordering in Enhanced Cell_Fach", InterDigital, 3GPP TSG-RAN WG2#57bis, Mar. 26-30, 2007, pp. 1-2.
3rd Generation Partnership Project (3GPP), R2-071620, "Solutions to Reordering Issue in Enhanced Cell_FACH", InterDigital, 3GPP TSG-RAN WG2#57bis, Kobe, Japan, May 7-11, 2007, pp. 1-3.
3rd Generation Partnership Project (3GPP), R2-071693, "Introduction of HS-DSCH Reception in CELL_FACH, URA_PCH and CELL_PCH", NSN, Nokia, 3GPP TSG RAN2#58, Kobe, Japan, Jan. 12-16, 2007, 96 pages.
3rd Generation Partnership Project (3GPP), R2-072197, "Solution to Reordering Issue in Enhanced Cell_FACH", InterDigital, 3GPP TSG-RAN WG2#57bis, Kobe, Japan, May 7-11, 2007, pp. 1-7.
3rd Generation Partnership Project (3GPP), RP-070035, "Status Report for WI to TSG", Rapporteur, Nokia, Juho Pirskanen, TSG: RAN WG: 2, TSG-RAN Meeting #35, Lemesos, Cyprus, Mar. 6-9, 2007, 4 pages.
3rd Generation Partnership Project (3GPP), TS 25.308 V7.1.0, "Technical Specification Group Radio Access Network, High Speed Downlink Packet Access (HSDPA), Overall Description, Stage 2 (Release 7)", Dec. 2006, pp. 1-34.
3rd Generation Partnership Project (3GPP), TS 25.308 V7.5.0, "Technical Specification Group Radio Access Network, High Speed Downlink Packet Access (HSDPA), Overall Description, Stage 2 (Release 7)", Dec. 2007, pp. 1-50.
3rd Generation Partnership Project (3GPP), TS 25.308 V8.0.0, "Technical Specification Group Radio Access Network, High Speed Downlink Packet Access (HSDPA), Overall Description, Stage 2 (Release 8)", Dec. 2007, pp. 1-50.
Third Generation Partnership Project, "Technical Specification Group Radio Access Network; Medium Access Control (MAC) Protocol Specification (Release 7), "3 GPP TS 25.321 V7.3.0 (Dec. 2006).
3rd Generation Partnership Project (3GPP), TS 25.321 V7.7.0, "Technical Specification Group Radio Access Network, Medium Access Control (MAC) Protocol Specification (Release 7)", Dec. 2007, pp. 1-146.
3rd Generation Partnership Project (3GPP), TS 25.322 V7.2.0, "Technical Specification Group Radio Access Network, Radio Link Control (RLC) Protocol Specification (Release 7)", Sep. 2006, pp. 1-80.
3rd Generation Partnership Project (3GPP), TS 25.322 V7.5.0, "Technical Specification Group Radio Access Network, Radio Link Control (RLC) Protocol Specification (Release 7)", Dec. 2007, pp. 1-88.
3rd Generation Partnership Project (3GPP), TS 25.322 V8.0.0, "Technical Specification Group Radio Access Network, Radio Link Control (RLC) Protocol Specification (Release 8)", Dec. 2007, pp. 1-89.
3rd Generation Partnership Project (3GPP), TS 25.331 V7.1.0, "Technical Specification Group Radio Access Network, Radio Resource Control (RRC), Protocol Specification (Release 7)", Jun. 2006, pp. 1-1272.
3rd Generation Partnership Project (3GPP), TS 25.331 V7.3.0, "Technical Specification Group Radio Access Network, Radio Resource Control (RRC), Protocol Specification (Release 7)", Dec. 2006, pp. 1-1316.
3rd Generation Partnership Project (3GPP), TS 25.331 V7.7.0, "Technical Specification Group Radio Access Network, Radio Resource Control (RRC), Protocol Specification (Release 7)", Dec. 2007, pp. 1-1469.
3rd Generation Partnership Project (3GPP), TS 25.331 V8.1.0, "Technical Specification Group Radio Access Network, Radio Resource Control (RRC), Protocol Specification (Release 8)", Dec. 2007, pp. 1-1471.
3rd Generation Partnership Project (3GPP), TS 25.433 V7.3.0, "Technical Specification Group Radio Access Network, UTRAN Lub Interface Node B Application Part (NBAP) Signalling (Release 7)", Dec. 2006, pp. 1-848.
3rd Generation Partnership Project (3GPP), TS 25.433 V7.7.0, "Technical Specification Group Radio Access Network, UTRAN Lub Interface Node B Application Part (NBAP) Signalling (Release 7)", Dec. 2007, pp. 1-982.
3$^{rd}$ Generation Partnership Project (3GPP) R2-071054, "Stage 2 updates for Enhanced CELL_FACH state in FDD", Ericsson, 3GPP TSG RAN WG2 Meeting #57, St. Louis, USA, Feb. 12-16, 2007, 35 pages.

* cited by examiner

METHODS AND APPARATUS FOR REORDERING DATA IN AN EVOLVED HIGH SPEED PACKET ACCESS SYSTEM

CROSS REFERENCE TO RELATED APPLICATIONS

This application is a continuation of U.S. patent application Ser. No. 12/048,855 filed Mar. 14, 2008, which claims the benefit of U.S. provisional application No. 60/895,028 filed Mar. 15, 2007, 60/895,835 filed Mar. 20, 2007, 60/915,023 filed Apr. 30, 2007, 60/916,993 filed May 9, 2007, 60/940,209 filed May 25, 2007, and 60/941,465 filed Jun. 1, 2007, which are incorporated by reference as if fully set forth.

FIELD OF INVENTION

The present invention is related to wireless communications.

BACKGROUND

Evolved high speed packet access (HSPA) systems are currently being developed within the framework of the Third Generation Partnership Project (3GPP) Release 7. One feature of the 3GPP Release 7 is the possibility for a user equipment (UE) to receive user and/or control data via a high-speed downlink shared channel (HS-DSCH) not only in a Cell_DCH state but also in Cell_FACH, URA_PCH, Cell_PCH states.

In the high speed downlink packet access (HSDPA), a UE receives a packet, (i.e., MAC-hs protocol data unit (PDU) or MAC-ehs PDU), from a Node-B implementing a hybrid automatic repeat request (HARQ) technique. In the Cell_DCH state, the UE sends a positive acknowledgment (ACK) or a negative acknowledgment (NACK) to the Node-B after each HARQ transmission to indicate whether the UE received the packet successfully or not.

Because of the delay required by the UE to decode and then transmit this feedback, the Node-B transmits (or retransmits) different packets after sending the packet but before receiving the corresponding feedback for continuous transmission of packets. Since the number of transmissions required for successful decoding at the UE varies from packet to packet, there is a possibility that the HARQ entity in the UE does not deliver packets in the same order as their respective initial transmissions from the Node-B. To alleviate this issue, the medium access control (MAC) layer in the UE performs reordering prior to delivery of the received packets to higher layers. The reordering is based on a transmission sequence number (TSN) in the MAC-hs header.

While in the Cell_DCH state, a UE determines whether an HS-DSCH transmission from the Node-B is destined to the UE by masking the cyclic redundancy check (CRC) of the high-speed shared control channel (HS-SCCH) with its unique, (i.e., UE-specific), HS-DSCH radio network temporary identifier (H-RNTI). However, while in the Cell_PCH, URA_PCH, or Cell_FACH states, the UE does not necessarily have a UE-specific H-RNTI. For instance, upon cell reselection, the UE does not necessarily know its UE-specific H-RNTI to use in the target cell when the UE receives a cell update confirm message. To resolve this problem, the network may use a common H-RNTI that all WTRUs may decode and use in-band signaling to identify the UE. In addition, a common H-RNTI may be needed to allow the network to broadcast messages, (e.g., broadcast control channel (BCCH) messages), to all WTRUs camping on a given cell.

Some problems arise when attempting to implement the reordering functionality with UE(s) receiving data via the HS-DSCH utilizing a common H-RNTI. A first problem is that a UE potentially delays delivery of data to higher layers because the reordering function waits for the arrival of packets that are not even destined to the UE.

Another problem occurs when the UE performs MAC-hs or MAC-ehs reset, (e.g., upon cell resection). After performing cell reselection, a UE initializes some variables related to reordering, (e.g., next_expected_TSN and RcvWindow_UpperEdge), during the MAC-ehs reset. When utilizing a common H-RNTI, however, the target cell cannot re-initialize the TSN value without affecting all other WTRUs already utilizing this common H-RNTI in that target cell. Therefore, the UE joining the target cell cannot rely on the re-initialization of the TSN to perform subsequent reordering. As a result, undesirable effects may occur. For instance, if the sequence number (SN) of the first received packet after the MAC-ehs reset happens to be within the initial receive window and below the initial value of next_expected_TSN, this packet will be discarded.

Prior art could result in excessive delays upon performing the cell update procedure when utilizing the HS-DSCH in a Cell_FACH state. Node-B transmissions over the high-speed channel that are made without knowledge of the UE identity, (i.e., using a common H-RNTI), present a difficulty for the support of reordering. The Node-B cannot use UE-specific TSNs since the identity of the intended receiver is not known at the MAC-ehs entity of the UE. Thus, a UE starting to listen to such transmissions has no knowledge of the next TSN to expect for in-sequence delivery.

SUMMARY

Method and apparatus for receiving HS-DSCH transmissions are disclosed. A MAC-ehs entity in a wireless transmit/receive unit (WTRU) receives MAC-ehs PDUs via an HS-DSCH while in one of Cell_FACH, Cell_PCH, and URA_PCH states. The reordering PDUs included in the MAC-ehs PDUs may be sent to a next processing entity without performing reordering of the reordering PDUs.

A single hybrid automatic repeat request (HARQ) process may be used for receiving the MAC-ehs PDUs, and all retransmissions of a MAC-ehs PDU may be completed before starting transmission of a subsequent MAC-ehs PDU. Alternatively, no HARQ retransmissions may be performed for the MAC-ehs PDUs and all MAC-ehs PDUs may be transmitted only once. Alternatively, an HARQ entity may hold a received MAC-ehs PDU and deliver the received MAC-ehs PDU only after completion of last HARQ transmissions of the received MAC-ehs PDU. Alternatively, an HARQ entity may deliver a successfully decoded MAC-ehs PDU immediately to the next processing entity and send an indication when last HARQ transmission for the successfully decoded MAC-ehs PDU occurs. A duplicate avoidance and reordering (DAR) function may be applied at a radio link control (RLC) layer to all logical channels or acknowledged mode (AM) data.

A certain reordering queue may enter a suspend state upon occurrence of a triggering event and MAC-ehs PDUs distributed to the reordering queue in the suspend state may be forwarded to the next processing entity without performing reordering of the reordering PDUs. MAC-ehs reset procedure may be extended for a certain transmission such that the MAC-ehs reset is performed after receiving a MAC-ehs PDU in a target cell. When performing a MAC-ehs reset, variables next_expected_TSN and RcvWindow_UpperEdge is set to a value "Pending".

A transmission sequence number (TSN) to be used in a cell for sending a MAC-ehs PDU using a common HS-DSCH radio network temporary identity (H-RNTI) may be provided to a WTRU and the MAC-ehs entity may be configured with the TSN. A radio resource control (RRC) message transmitted via an HS-DSCH using a common HS-DSCH radio network temporary identity (H-RNTI) may be controlled to be small enough to fit into a single MAC-ehs PDU.

In a reordering pending state, reordering variables may be sent based on a TSN of the first MAC-ehs PDU. The received MAC-ehs PDUs may be stored in a reordering buffer and delivered to a higher entity based on HARQ information. When TSN numbers are restricted, a modulo x may be used for all arithmetic operation of a reordering entity, where x is a lowest TSN number restricted. The TSN may be assigned to each WTRU independently.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment, a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment. Hereinafter, embodiments will be explained with reference to Cell_FACH state as an example. It should be noted that embodiments are applicable to Cell_PCH or URA_PCH states.

Figure 1:
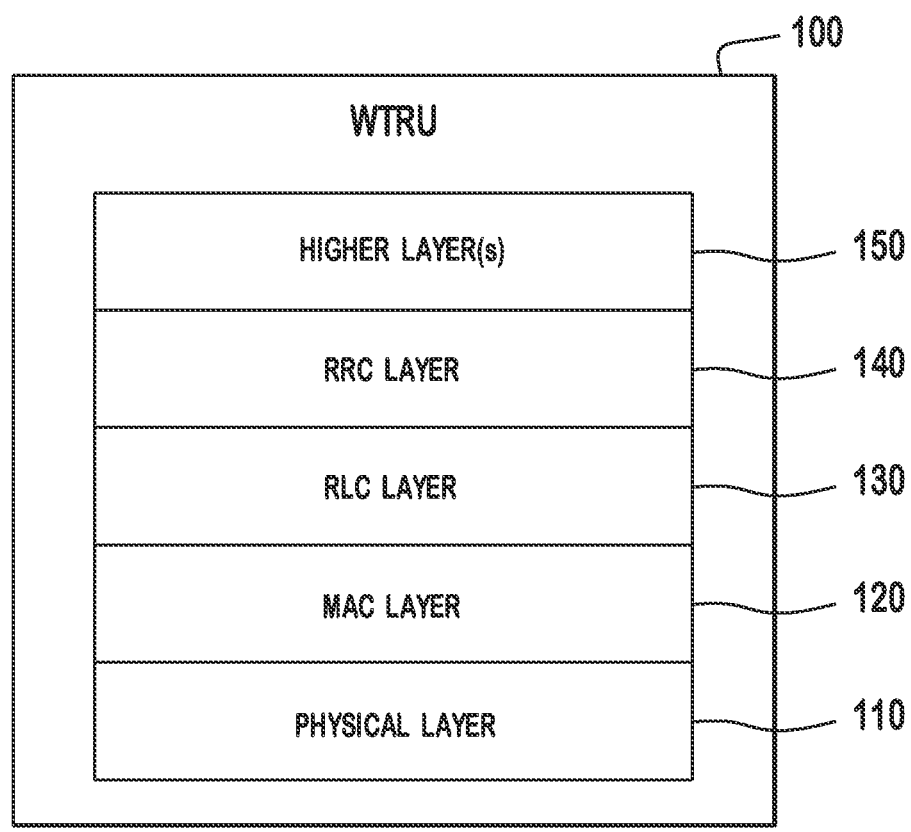
FIG. 1 is a block diagram of an example WTRU.

FIG. 1 is a block diagram of an example WTRU 100. The WTRU 100 includes a physical layer 110, a medium access control (MAC) layer 120, a radio link control (RLC) layer 130, a radio resource control (RRC) layer 140, a higher layer(s) 150, and the like. The MAC layer 120 includes a MAC-ehs entity. It should be noted that the MAC-ehs entity may be called as a MAC-hs entity or any other name. Hereinafter, only the terminology "MAC-ehs" will be used.

Figure 2:
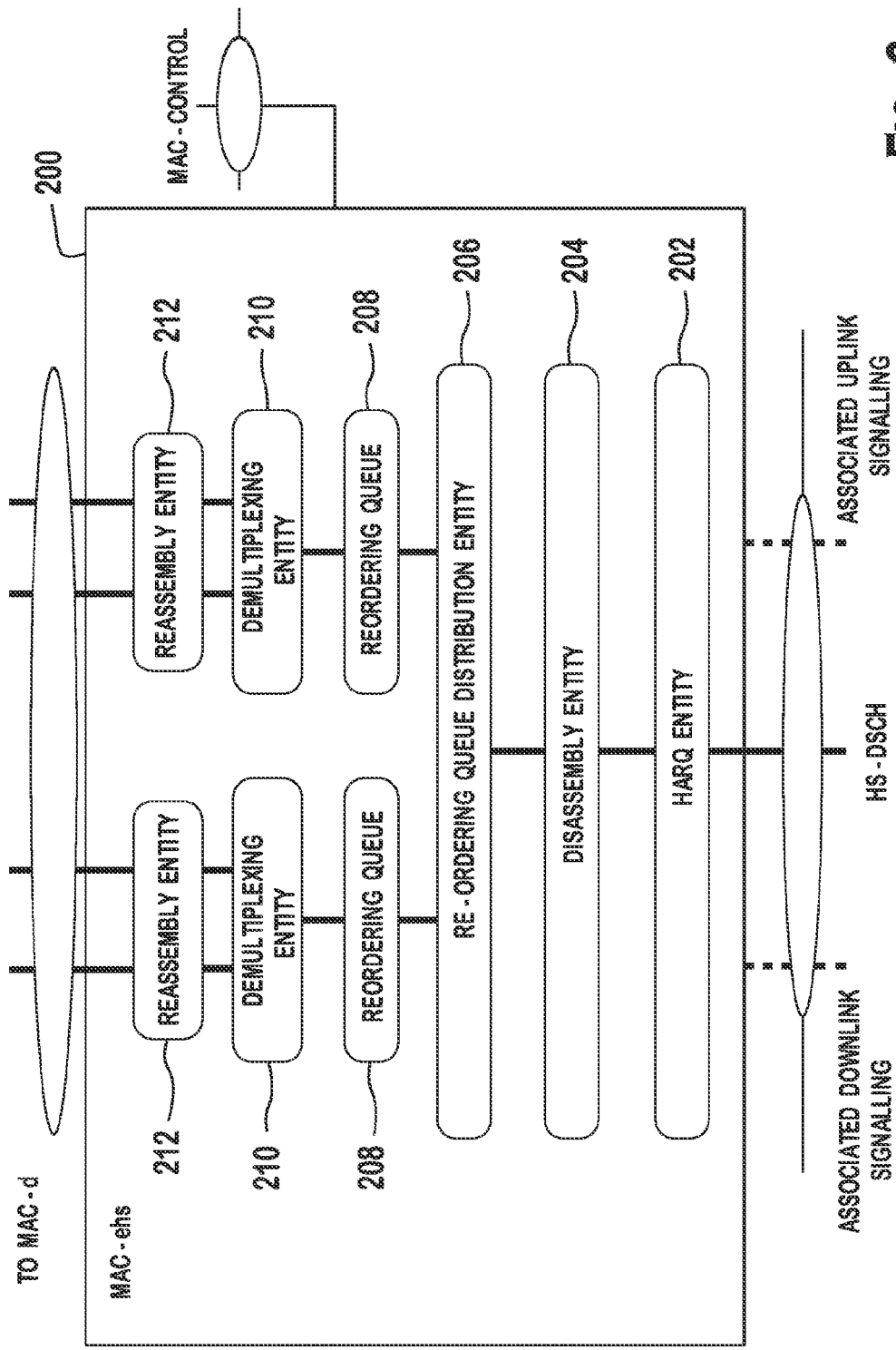
FIG. 2 is a block diagram of a MAC-ehs entity.

FIG. 2 is a block diagram of a MAC-ehs entity 200. The MAC-ehs entity 200 includes a hybrid automatic repeat request (HARQ) entity 202, a disassembly entity 204, a reordering queue distribution entity 206, a plurality of reordering queues 208, demultiplexing entities 210, and reassembly entities 212. The received MAC-ehs PDU via the HARQ entity 202 is disassembled into reordering PDUs by the disassembly entity 204. The reordering PDUs are distributed to a reordering queue 208 by the reordering queue distribution entity 206 based on the received logical channel identifier. The reordering PDUs are reorganized according to the transmission sequence number (TSN). Reordering PDUs with consecutive TSNs are delivered to a higher layer upon reception. A timer mechanism determines delivery of non-consecutive data blocks to higher layers. There is one reordering entity 208 for each priority queue. The demultiplexing entity 200 routes the reordered reordering PDUs to a reassembly entity 202 based on the logical channel identifier. The reassembly entity 202 reassembles segmented MAC-ehs SDUs to original MAC-ehs SDUs and forwards the MAC-ehs SDUs to upper layers.

In accordance with a first embodiment, MAC-ehs PDUs are delivered in-sequence from the HARQ entity and a MAC-ehs layer may be relieved from its reordering duty by ensuring that packets are always received in order at the WTRU. If the MAC-ehs layer does not have to perform reordering, the MAC-ehs reset functionality may be simplified when the WTRU is not assigned a WTRU-specific H-RNTI. Four options for implementing the first embodiment are disclosed below.

With a first option for the first embodiment, a single HARQ process is used for certain transmissions. The transmissions may be from a certain priority queue, from a certain logical channel, or for which the identity of the destined WTRU is not known at the MAC-ehs entity, (i.e., when MAC-ehs PDUs are sent using a common H-RNTI). In the Cell_FACH state, the MAC-ehs entity in the Node-B transmits MAC-ehs PDUs repeatedly for a preconfigured number of times without receiving feedback from the WTRU, which is called a repetitive HARQ transmission scheme. The Node-B completes all retransmissions of a MAC-ehs PDU before starting transmission of a subsequent MAC-ehs PDU for the certain transmissions for which in-order delivery is essential.

With the first option, a large delay imposed by the minimum interval between successive HARQ transmissions on the same HARQ process that is defined in the current 3GPP specifications may be an issue. Under the current 3GPP specifications, a WTRU may discard any MAC-ehs PDU intended for a HARQ process if it is received within five (5) sub-frames from the last reception of data intended for the same HARQ process. Such a restriction is justifiable when utilizing the HS-DSCH in a Cell_DCH state since a certain minimum round-trip time is imposed by the HARQ feedback from the WTRU. However, when utilizing the HS-DSCH in a Cell_FACH state, a WTRU is not sending ACK/NACK feedback to the Node-B and thus a shorter interval is feasible.

The delay problem may be resolved by configuring the MAC-ehs entity differently while the WTRU is in a Cell_FACH state. For example, in the Cell_FACH state, the MAC-ehs entity of the WTRU may be configured not to discard packets received within five sub-frames from the last reception of a packet intended for the same HARQ process, and may do so only in the Cell-DCH state.

Alternatively, in the Cell_FACH state, the WTRU MAC-ehs entity may be configured to discard a packet intended for an HARQ process if it is received within n sub-frames from the last reception of a packet intended for the same HARQ process. The number n may be fixed and pre-defined in the specifications. If n=0, it is understood that the minimum is not specified when the WTRU is in the Cell_FACH state. The number n may be WTRU-dependent. The minimum number of sub-frames n may be signaled by higher layers as a capability of the WTRU. For instance, the WTRU may signal in advance its capability information (as part of any information element of the higher layer protocol) to the radio network controller (RNC). The RNC may signal the minimum number of sub-frames n applicable to certain data. Alternatively, the RNC may signal to the Node-B the minimum number n to use for each logical channel, for each priority queue, or for each H-RNTI.

The above two alternatives may be combined so that a fixed and pre-defined minimum number of sub-frames m that is applicable to any WTRU utilizing the HS_DSCH in the Cell_FACH state may be provided along with a smaller WTRU-dependent value n (<m) by higher layers as a capability of the WTRU. This is useful for transmitting on certain logical channels that are not dedicated to a specific WTRU, such as common control channel (CCCH) or BCCH. In this case the Node-B may use a minimum of m for logical channels that are not dedicated to a specific WTRU and use a smaller WTRU-dependent minimum for data destined to a specific WTRU.

When a single HARQ process is used with the common H-RNTI only, the HS-SCCH format may be changed so that the conventional 3-bit "Hybrid-ARQ process information" field may be removed. This results in lesser number of information bits to encode in the HS-SCCH and would result in lower transmission power requirement. WTRUs may determine which scheme has been applied by relying on whether the transmission was masked by the common H-RNTI or not.

The Node-B may be informed to use a single HARQ process explicitly, using one of the conventional Node-B application part (NBAP) messages used for configuration or reconfiguration of HS-DSCH resources. A new information element (IE) may be added indicating the number of HARQ processes to be used by the MAC-ehs entity.

Alternatively, a conventional IE in the NBAP messages used for configuration of HS-DSCH resources may be extended for this purpose. For example, the HARQ memory allocation IE may be extended to include a new field indicating the number of HARQ process to be used or setting a bit string for all HARQ process to indicate which HARQ process can be used for a certain logical channel or a certain common H-RNTI.

Alternatively, the Node-B may be informed implicitly by means of another IE. For example, when the timer T1 is set to zero (0), it may implicitly mean that only one HARQ process is being used. Alternatively, a new IE that indicates no reordering or no segmentation may be used to implicitly signal single HARQ process.

Alternatively, the MAC-ehs entity in the Node-B may be instructed not to include a TSN, or include a TSN but not to increment the TSN, and this may implicitly indicate that a single HARQ process is used, or vice versa.

Alternatively, the Node-B may be informed over the Iub frame protocol. A new field may be added to the Iub frame protocol that indicates whether a particular message should be sent using a single HARQ process or multiple HARQ processes.

Any combination of the alternatives disclosed above may be used.

With a second option for the first embodiment, no HARQ retransmissions are performed for certain transmissions. The Node-B does not send any HARQ retransmissions for PDUs from a certain priority queue, from a certain logical channel, or for which the identity of the destined WTRU is not known at the MAC-ehs entity, (i.e., common H-RNTI is used), and the MAC-ehs PDUs for those data are transmitted only once over the air. The MAC-ehs PDUs will be received in order and the WTRU does not need to perform any reordering for the particular transmission. The MAC-ehs entity in the WTRU forwards successfully decoded PDUs directly to a higher entity, bypassing the reordering function altogether.

The WTRU may be informed that a single HARQ transmission takes place per PDU explicitly in the L3 configuration information, (e.g., BCCH/BCH), for a particular priority queue or logical channel or for particular transmissions. Alternatively, a new L1 signaling, (e.g., a new field in the HS-SCCH), may be used to indicate that no HARQ retransmissions will take place. Alternatively, fields in the HS-SCCH may be modified to indicate that no HARQ retransmission will take place for a particular packet. Alternatively, a new field may be added in the MAC-ehs header to indicate a single HARQ transmission of the packet.

With a third option for the first embodiment, a repetitive HARQ transmission scheme is used and delivery of a decoded packet is delayed at the HARQ entity of the WTRU. With this option, the Node-B may use more than a single HARQ process, (e.g., to provide better time diversity). However, a constraint is imposed such that the last HARQ transmissions of successive MAC-ehs PDUs are transmitted in order at the Node-B. In other words, the last HARQ transmission for MAC-ehs PDU #n−1 is always transmitted before the last HARQ transmission for MAC-ehs PDU #n. Such a constraint can be satisfied, for instance (but not limited to) when HARQ retransmissions occur at fixed interval (synchronous HARQ).

The HARQ entity at the WTRU does not deliver a successfully decoded packet until all transmissions, (i.e., the preconfigured number of repetitions), for this packet have been sent. In order to determine whether all transmissions for a packet has been made, the WTRU HARQ entity may wait for the reception of HS-SCCH transmission with a new data indicator (NDI) flag indicating a new PDU to deliver the decoded packet. Alternatively, the WTRU may count the number of transmissions, (e.g., based on the HS-SCCH transmissions), for MAC-ehs PDUs and deliver the successfully decoded MAC-ehs PDU only after the preconfigured maximum number of transmissions is reached with respect to this MAC-ehs PDU. The maximum number is signaled to the WTRU through higher layers.

With a fourth option for the first embodiment, the HARQ entity at the WTRU delivers successfully decoded packets immediately to the above entities, (i.e., reordering entity), in the MAC-ehs entity, and the reordering entity retains the delivered MAC-ehs PDU until it receives the indication from the HARQ entity that the last HARQ transmission has taken place. After receiving the indication, the reordering entity sends the MAC-ehs PDU to an above entities/sub-layers. The HARQ entity can make this determination based on one of the methods described in the third option.

With this option, the reordering entity does not need to use the TSN field of the MAC-ehs PDU (if present) to determine when to send the PDU to upper entities, but may still use a release timer (such as T1) to deliver a MAC-ehs PDU for which no indication has been received from the HARQ entity. Certain reordering queues may rely on the indication provided by the HARQ entity to determine when to deliver the PDUs to upper entities, while other reordering queues may use the conventional reordering mechanism.

In accordance with a second embodiment, MAC functionalities, (i.e., MAC-ehs functionalities), may be simplified for certain priority queues to avoid issues associated with reordering in the Cell-FACH state. The MAC functionality simplification may be implemented in conjunction with the first embodiment, and this would minimize (or eliminate) out-of-order delivery of MAC-ehs PDUs to higher layers.

With a first option for the second embodiment, reordering is avoided for data transmitted from certain priority queues. The MAC-ehs functionality at the WTRU is modified so that data received from certain priority queues is directly sent to a reassembly entity without performing reordering. The reassembly entity reassembles a MAC-ehs service data unit (SDU) from segments of the MAC-ehs SDU.

Figure 3:
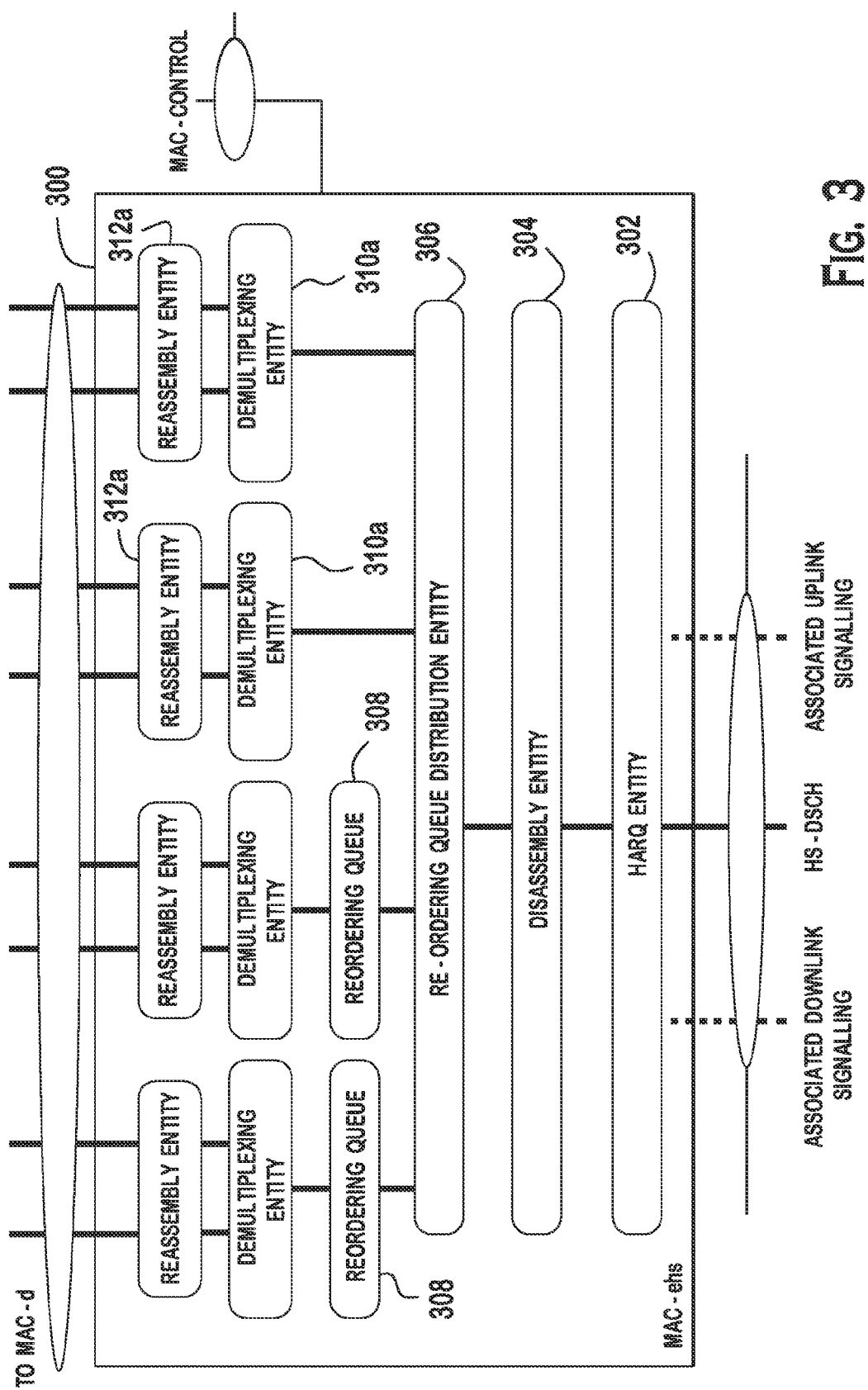
FIG. 3 is a block diagram of a WTRU MAC-ehs entity with no reordering for data received from certain priority queues.

FIG. 3 shows a MAC-ehs entity 300 in accordance with this option. It should be noted that the exact order of demultiplexing and reassembly functions may be different from FIG. 3. MAC-ehs PDUs received via the HARQ entity 302 are forwarded to a disassembly entity 304. The disassembly entity 304 disassembles the MAC-ehs PDUs into reordering PDUs. The reordering PDUs may be placed in a reordering queue 308 via the reordering queue distribution entity 306. In accordance with this option, for certain priority queues, the reordering is avoided and the reordering PDUs are directly forwarded to the demultiplexing entity 310a. The demultiplexing entity 310a routes the reordering PDUs to a correct reassembly entity 312a based on the logical channel identity. The reassembly entity 312a reassembles segmented MAC-ehs SDUs to a complete MAC-ehs SDU.

Different criteria may be used to determine whether the data should be distributed to a reordering entity for reordering or to a reassembly entity without reordering. If the identity of the WTRU that the data within the MAC-ehs PDU is destined to is not known to the MAC-ehs entity, (i.e., when the MAC-ehs PDUs are transmitted using a common H-RNTI), the MAC-ehs PDU may be sent to the reassembly entity without performing reordering. The MAC-ehs entity knows the identity of the WTRU if the MAC-ehs PDU has been received using a dedicated H-RNTI or if a WTRU identity is contained within the MAC-ehs PDU. The Node-B may always use a common H-RNTI for any data from a priority queue that does not support reordering.

Whether the data should be distributed to a reordering entity for reordering or to a reassembly entity without reordering may depend on a logical channel identity of the received data, regardless of whether the data is received using a common H-RNTI or a dedicated H-RNTI. This allows multiplexing data from priority queues that support reordering with data from priority queues that do not support reordering. This also allows not utilizing the reordering functionality even when a dedicated H-RNTI is used.

The logical channels that support reordering may be pre-determined based on the type of logical channel, (e.g., CCCH, BCCH, paging control channel (PCCH), DCCH, and the like), and/or a logical channel identity.

Alternatively, the WTRU may be informed by higher layers, (e.g., radio resource control (RRC) signaling), of which logical channels support reordering. For example, the "RB mapping info" IE contains information on the downlink radio link control (RLC) logical channel(s). An IE may be added to indicate whether reordering is performed at the MAC-ehs for each logical channel. Alternatively, in the "RB mapping info" IE, the "Reordering queue ID" IE that may be added to support the L2 enhancements may take a special value indicating a queue that does not support reordering. Alternatively, the IE indicating the parameters of the queue, (e.g., "Added or reconfigured MAC-d flow", common MAC flow broadcasted in system information, or the like), may be modified or extended to indicate whether the queue supports reordering or not. Such indication may be given by adding a new IE indicating if reordering is supported, or alternatively some of the conventional IEs may take a new possible value that would indicate that reordering is not supported. For instance, the "T1" IE may take as one of its possible values, (e.g., "0"), indicating that reordering is not supported on this queue. The "MAC-hs window size" IE may also take as one of its possible values, (e.g., "0"), indicating the same.

Alternatively, other indication in the MAC-ehs PDU header may be used to indicate which logical channel(s) supports reordering and which logical channel(s) does not. For example, a special field indicating whether reordering is to be applied or not may be included. Another example is utilization of a special value for the TSN field, (e.g., "111111").

Any combination of the above alternatives may be used to indicate which logical channel(s) supports reordering and which logical channel(s) does not. For example, the logical channel identity combined with the WTRU ID may be used to indicate whether the MAC-ehs PDU should be sent to the reordering queue for reordering or the reassembly entity without performing reordering. Signaling radio bearer #1 (SRB#1) messages will be sent on a DCCH using a common H-RNTI, but other messages may be sent on a DCCH using a dedicated H-RNTI. DCCH messages with a common H-RNTI may be sent to the reassembly entity without performing reordering, while DCCH messages with a dedicated H-RNTI may be sent to the reordering queues for reordering.

Although re-ordering is not performed, the TSN field may still be used by the MAC-ehs entity in the Node-B when building the MAC-ehs PDU, and the TSN field may be used to facilitate the reassembly operation at the WTRU. For example, the reassembly entity may delete any segment present in the reassembly buffer if non-consecutive TSNs are received.

Alternatively, the TSN may be removed from the MAC-ehs header. In this case, the WTRU may still use the segmentation indication to reassemble packets, even though there is a possibility of bad reassembly if a PDU is missing. In case the TSN field is not used, the WTRU would know whether to expect a TSN field in the MAC-ehs header for a logical channel based on the knowledge of the mapping between this logical channel and a queue that does not support reordering.

A process for reassembling segmented MAC-ehs SDUs in case that the TSN field is kept in the MAC-ehs header, but reordering is not performed is explained hereinafter. After receiving a MAC-ehs PDU, a WTRU determines whether the payload of the MAC-ehs PDU is a full MAC-hs SDU, or a segment, and if it is a segment, whether it is a first segment, a middle segment, or a last segment. If the payload is a full MAC-ehs SDU, the MAC-ehs SDU is forwarded to a higher layer or to an entity following the reassembly entity.

If the payload is the first segment of a MAC-ehs SDU, and if the WTRU has a stored middle segment(s) with a consecutive sequence number higher than the received PDU, the first segment is combined with the consecutive segments. If the WTRU has stored a last segment with a consecutive sequence number higher than the received PDU, they are combined and the full MAC-ehs SDU is delivered to an upper layer. Otherwise, the payload is stored in the reassembly entity.

If the payload is a last segment of a MAC-ehs SDU, and if the reassembly entity has stored consecutive segment with a TSN lower than the received packet, they are combined. If a full MAC-ehs SDU is formed, it is delivered to an upper layer. Otherwise, the last segment is stored in the reassembly buffer.

If the payload is a middle segment of a MAC-ehs SDU, and if the reassembly entity has stored consecutive segments with TSNs higher or lower than the received packet, they are combined. If a full SDU is created, it is forwarded to a higher layer. Otherwise, it is stored in the reassembly buffer.

To discard segments from the reassembly entity, a timer-based discard mechanism may be used. Optionally, the packet may be discarded if the buffer is full or the maximum amount of segments allowed to be stored is reached. Segments with the oldest TSN numbers may be discarded. In addition, the conventional re-ordering parameters RcvWindow_UpperEdge, next_expected_TSN, T1_TSN, and TSN_Flush are not required to be maintained and processed.

The timer-based discard mechanism may be implemented in one or a combination of the following ways. Every segment is maintained in the reassembly buffer for a configured period of time, (i.e., every time a segment corresponding to a MAC-ehs SDU is received, a timer for that segment is started). When the timer expires, all segments corresponding to that MAC-ehs SDU are discarded. The timer starts only when a segment corresponding to a reordering PDU with a TSN greater than the next_expected_TSN is received. A variable Tseg_TSN is set to this TSN. When the timer expires the following actions may be performed.
  a. If segment indicator (SI) of Tseg_TSN is "01",
    i. Discard all payload units with TSN≤Tseg_TSN; and
    ii. Set next_expected_TSN to the next not received segment TSN.
  b. If SI of T1_TSN is "10",
    i. Discard all payload units with TSN<Tseg_TSN; and
    ii. Set next_expected_TSN to the next not received segment TSN.
  c. If SI of Tseg_TSN is "11",
    i. Discard the first payload unit corresponding to that TSN and all payload units with TSN<T1_TSN. This step must ensure that the last payload unit corresponding to that TSN is not discarded, since that payload unit corresponds to the first payload unit.

Figure 4:
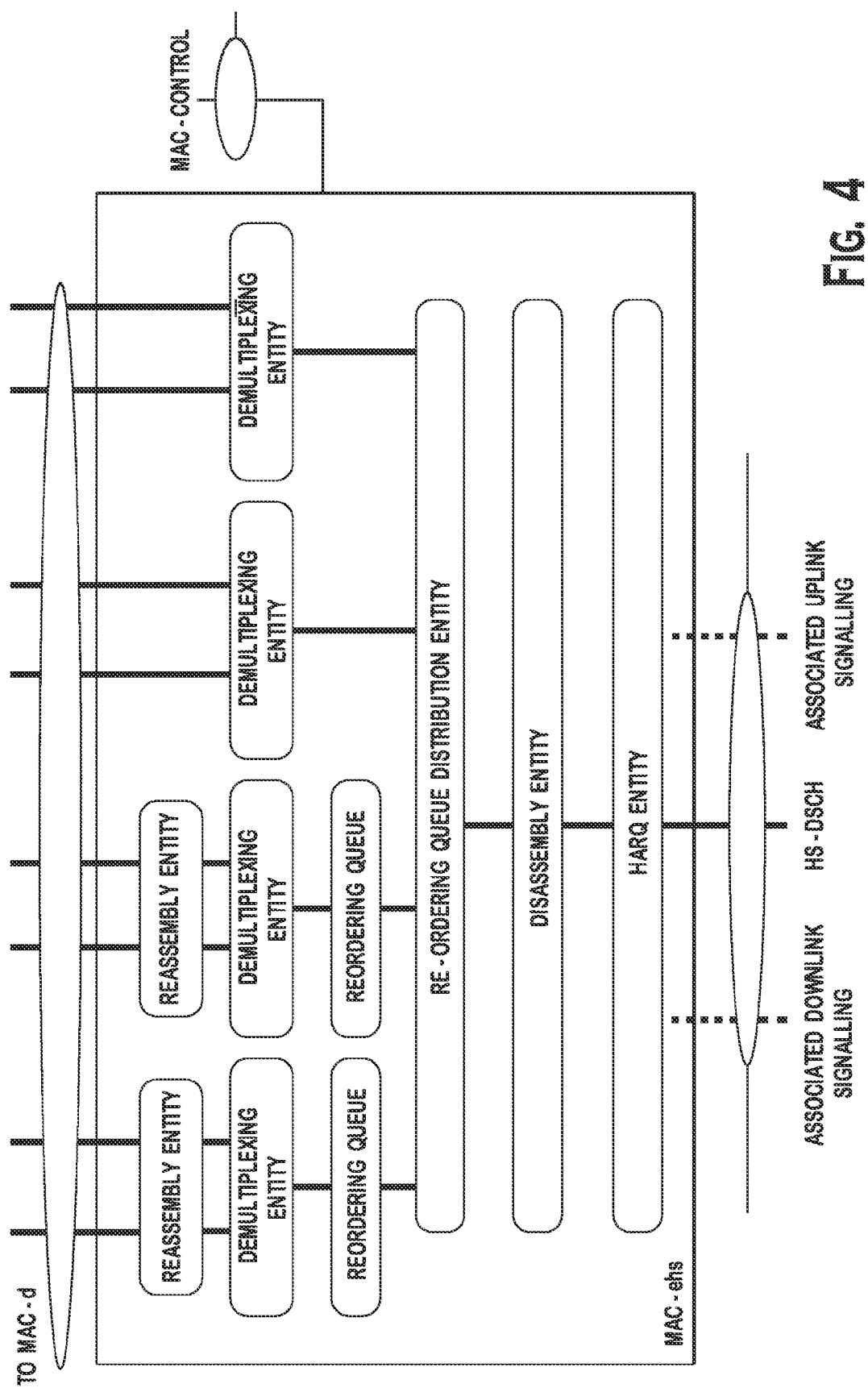
FIG. 4 is a block diagram of a WTRU MAC-ehs entity with no reordering and no reassembly for data received from certain priority queues.

With a second option for the second embodiment, segmentation, reordering and reassembly are avoided for data transmitted from certain priority queues. Any data transmitted from certain priority queues does not undergo segmentation, reassembly, or reordering. FIG. 4 shows the MAC-ehs entity in the WTRU in accordance with this option. As in the first option for the second embodiment, different criteria may be used to determine whether the data should be distributed to a reordering queue for reordering or not.

With this option, it is not required to add TSN and SI fields to the MAC-ehs PDUs for the corresponding queues. Alternatively, the TSN and SI fields may be added, but the SI field may always be set to a certain value, (e.g., "00"), and the TSN may be set to a constant value, or optionally incremented but not used for any reordering or reassembly purposes. Furthermore, when setting up the queues at the WTRU, there is no need to maintain and process the following variables: TSN number, RcvWindow_UpperEdge, next_expected_TSN, T1_TSN, and TSN_Flush.

When receiving a MAC-ehs PDU, the WTRU knows that the TSN and SI fields are not present for a certain logical channel based on either the knowledge of the mapping of this logical channel to a given queue that does not support reordering and segmentation/reassembly, or based on the use of a common H-RNTI when transporting this channel. In such case, MAC-ehs SDUs are immediately disassembled and de-multiplexed according to logical channel and sent to a higher layer.

With respect to the second embodiment, a MAC-ehs reset procedure may be modified. In accordance with a conventional MAC-ehs reset procedure, if a MAC-ehs reset is requested by an upper layer, the WTRU shall, at the activation time indicated by higher layers;
  a) flush soft buffer for all configured HARQ processes;
  b) stop all active re-ordering release timer (T1) and set all timer T1 to their initial value;
  c) start TSN with value '0' for the next transmission on every configured HARQ process;
  d) initialize the variables RcvWindow_UpperEdge and next_expected_TSN to their initial values;
  e) disassemble all MAC-ehs PDUs in the re-ordering buffer and deliver all MAC-d PDUs to the MAC-d entity;
  f) flush the re-ordering buffer; and
  g) if the MAC-ehs reset was initiated due to reception of the IE "MAC-hs reset indicator" by the upper layers, indicate to all acknowledged mode (AM) RLC entities mapped on an HS-DSCH to generate a status report.

If the first option of the second embodiment is implemented, this procedure is modified so that step (d) is only performed for the queues that support reordering. If the first option is implemented with reassembly functionality, the reset procedure should ensure that the reassembly buffer is flushed after the last MAC-ehs PDU has been processed.

If the second option of the second embodiment is implemented, this procedure should be modified so that steps (b)-(f) are only executed for the queues that support reordering. In addition, segments in the reassembly buffer that cannot be successfully reassembled should be discarded.

It should be noted that some of these steps may have to be modified to support other upcoming features of HSPA evolved, such as L2 improvements.

The simplifications to the MAC-ehs entity functionality described above may result in out-of-order delivery of MAC SDUs to the RLC entity. This may cause difficulties particularly when the MAC-ehs SDUs carry RRC signaling. These difficulties may be avoided if the RLC entity performs reordering. Conventionally, a duplicate avoidance and reordering (DAR) function is defined for an unacknowledged mode (UM) of the RLC. However, the DAR function is currently only applicable to a multimedia broadcast/multicast service (MBMS) traffic channel (MTCH).

In accordance with a third embodiment, the DAR function is applied to other logical channels than MTCH, such as DCCH or DTCH. Such extension of RLC UM DAR functionality would be especially useful for the case of signaling radio bearer (SRB) #1 which is defined with RLC UM.

Several methods are possible to enable the use of DAR functionality to the other logical channels. The WTRU may be informed of the parameters to use for the DAR function by higher layers, or the parameters may be pre-determined. For instance, RRC signaling may be modified so that the "DL Duplication Avoidance and Reordering Info" may optionally be present not only within the "RLC info MBMS" IE but also within the "RLC info" IE, if the UM RLC mode is selected. The parameter values for the default radio configurations may also be updated with the new parameter for SRB1 and other RBs.

Similarly, DAR or a similar function may be introduced in the RLC acknowledge mode (AM) of operation, where it may be configured that the AM RLC delivers SDUs in-sequence to higher layers. The conventional AM RLC does not perform any reordering on the receive side.

The reordering functionality may be modified to prevent excessive delays during the cell update procedure when HS-DSCH is utilized in the Cell_FACH state. This scheme may be used if it is desired to keep the reordering functionality for a certain priority queue. This scheme does not assume any modification to the HARQ entity behavior, but would be effective regardless of whether such modifications are implemented or not.

It should be noted that the embodiments described below are not only applicable to the cell update procedure (cell reselection), but also applicable to initial configuration and setup of the MAC-ehs entity when entering the enhanced CELL_FACH state or initiating HS-DSCH reception in the CELL_FACH, CELL_PCH or URA_PCH states.

In accordance with a fourth embodiment, a reordering queue may enter the suspend reordering state when a certain triggering event occurs. While in the normal state, the conventional reordering procedures are performed. While a reordering queue is in the suspend reordering state, received data going into the suspend state reordering queue is directly transferred to the next processing entity, (e.g., a reassembly entity, a disassembly entity, a demultiplexing entity depending on the MAC-ehs architecture, or a layer above the MAC-ehs entity), without consideration for the TSN associated with the data.

The triggering events to get into the suspend reordering state may be, for instance, execution of a MAC-ehs reset procedure, (possibly following a command from an RRC entity), or an explicit command from the RRC entity to go into the suspend reordering state. The RRC entity may issue this command, for instance, upon initiating a cell update procedure with a cause of cell reselection. If an explicit command is issued, the RRC entity may optionally decide to flush the reordering buffer.

The reordering queue(s) that is subject to suspension of reordering may be signaled by higher layers along with (or as part of) the RRC command, if applicable. The higher layer signaling may be performed using one of the options listed above. Alternatively, it may be pre-signaled upon setting up the logical channel mapped to the queue, or it may be pre-defined depending on the type of logical channel mapped to the queue, (e.g., it may be pre-defined such that any queue mapped onto a CCCH logical channel undergoes suspension of reordering upon MAC-ehs reset).

The reordering queue returns to the normal state when a certain transition event occurs. The transition events may be, for example, reception of a packet for the logical channel mapped to the queue after entering into the suspend state. After receiving the packet, the WTRU performs the following actions:

(a) Set next_expected_TSN=TSN−x, where, for example, −1≤x<6 (the value of x>0 is to ensure that if a first packet is received out of order, it will not discard the next packets with lower TSNs) and the TSN is the transmission sequence number of the received packet, and the value of x may be pre-determined or pre-signaled by higher layers;

(b) If x is not equal zero or −1, set T1_TSN=TSN of this packet and start the T1 timer;

(c) Set RcvWindow_UpperEdge=TSN+y, where y may be pre-determined or pre-signaled by higher layers; and (d) Return to normal reordering state.

It should be noted that for the above event, a definition of a new state is not formally needed since the WTRU does not receive any data for the concerned queue while in the suspended reordering state. It would be equivalent to say that the MAC-ehs reset procedure for the concerned queues is completed only after reception of data for these queues.

The transition event may be an explicit command from the RRC entity to return to the normal reordering state. In this case, the RRC entity notifies the MAC-ehs entity when the MAC-ehs entity should return to the normal reordering state. Such command may itself be triggered by the RRC entity receiving a cell update confirm message from its peer entity, or any other event related to RRC procedures. Prior to receiving the command to return to the normal reordering state, (i.e., while in the suspend reordering state), the WTRU has to maintain the next_expected_TSN, and RcvWindow_UpperEdge variables for each concerned queue in the following manner:

(a) At the first time a packet is received for the queue after the MAC-ehs reset:
  (i) Set next_expected_TSN to TSN+1 of this packet.
  (ii) Set RcvWindow_UpperEdge to TSN+y, where y may be pre-determined or pre-signaled by higher layers.
  (iii) Optionally, the variable "TSN_init" may be set to the TSN of the received packet.

(b) For subsequent packets for the same queue with transmission sequence number=TSN:
  (i) Set next_expected_TSN to TSN+1 if TSN≥next_expected_TSN.
  (ii) Set RcvWindow_UpperEdge to TSN+y if TSN+y>RcvWindow_UpperEdge, where y may be pre-determined or pre-signaled by higher layers.

The transition event to return to the normal state may be expiration of a timer (T_init) started upon transition to the pending state. This timer may be the same as the conventional T1 timer. If it is not the same, the value of the T_init timer may be either specified by higher layers, (e.g., using the same RRC signaling messages that contain the value of the T1 timer, with an additional information element for the value of this new T_init timer), or pre-defined. This value may be lower than or equal to the T1 timer to avoid excessive delays.

When a triggering event to the suspend reordering state occurs, (e.g., when a MAC-ehs reset occurs), the reordering queue enters and stays in the suspend reordering state for the duration of the T_init timer (plus possibly the period of time between the MAC-ehs reset and the reception of the first correct MAC-ehs PDU, if it is elected to start the T_init timer upon reception of this PDU). Optionally, the values of "next_expected_TSN" and "RcvWindow_UpperEdge" may be set to a special value ("pending") upon execution of the MAC_ehs reset instead of being set to their initial values as in the conventional procedure, which will be explained in detail below.

Alternatively, the transition event may be successful reception of N number of PDUs with consecutive TSNs, or N out of M successful PDUs within M consecutive TSNs.

It should be noted that in the event MAC-ehs reset is performed after a cell update confirm is received by higher layers, the variables and contents of these queues should not be reset upon MAC-ehs reset indication. In this case, if the queue is in the suspend reordering state, the MAC-ehs reset will be an indication that the cell update confirm has been received by higher layers, and the queue can return to the normal state.

In accordance with a fifth embodiment, the MAC-ehs reset procedure is modified so that for certain reordering queues, the reset procedure is extended until the reception of data in the target cell. The variables next_expected_TSN and RcvWindow_UpperEdge are not reset to their initial values for the concerned reordering queues immediately, but only upon reception of data for these queues in the target cell.

If a reset of the MAC-ehs entity is requested by upper layers, the WTRU shall at the activation time indicated by higher layers:

(1) flush soft buffer for all configured HARQ processes;

(2) stop all active re-ordering release timer (T1) and set all timer T1 to their initial value;

(3) disassemble all MAC-ehs PDUs in the re-ordering buffer and deliver all MAC-d PDUs to the MAC-d entity (This step may be modified due to unrelated changes to the MAC-ehs procedure in future Releases);

(4) flush the re-ordering buffer; and (5) if the MAC-hs reset was initiated due to reception of the IE "MAC-hs reset indicator" by the upper layers, indicate to all AM RLC entities mapped on HS-DSCH to generate a status report.

For reordering queues for which the extended MAC-ehs procedure applies:

(1) When data (reordering PDU) is received for this reordering queue, set next_expected_TSN=TSN−x, where, for example, 0≤x<6, and TSN is the transmission number of the received reordering PDU, and the value of x may be pre-determined or pre-signaled by higher layers;

(2) Optionally, if x is not equal to zero, set T1_TSN=TSN of this packet and start T1 timer;

(3) Set RcvWindow_UpperEdge=TSN+y, where y may be pre-determined or pre-signaled by higher layers; and (4) End MAC-ehs reset procedure for the reordering queue.

For all other reordering queues:

(1) start TSN with value 0 for the next transmission on every configured HARQ process; and (2) initialize the variables RcvWindow_UpperEdge and next_expected_TSN to their initial values.

The queue(s) for which the extended MAC-ehs procedure applies may be signaled by higher layers along with (or as part of) the RRC command that triggers the MAC-ehs reset, if applicable. Alternatively, it may be pre-signaled upon setting up the logical channel mapped to the queue, or it may be pre-defined depending on the type of logical channel mapped to the queue, (e.g., it may be pre-defined that any queue mapped onto the CCCH logical channel undergoes the extended MAC-ehs reset procedure). The signaling can be performed using one of the options listed above.

In accordance with a sixth embodiment, additional special values are defined for the reordering variables next_expected_TSN and RcvWindow_UpperEdge. This special value may be labeled, for instance, by one of the following: Pending, Undefined, or Waiting, (the label "Pending" will be used hereafter).

For certain reordering queues, the MAC-ehs reset or new MAC-ehs configuration procedure is modified so that the variables "next_expected_TSN" and "RcvWindow_UpperEdge" are set to the value "Pending" instead of being set to their initial values as specified in the conventional procedure. Furthermore, the reordering functionality is also modified so that when a MAC-ehs PDU with TSN=SN is received, if the value of "next_expected_TSN" is set to "Pending", the following actions are performed:

(1) The T1 timer is not started;

(2) Next_expected_TSN is set to TSN+1 (or alternatively, TSN+x where x is pre-defined or set by higher layers, and); and (3) RcvWindow_UpperEdge is set to TSN+y, where y may be pre-determined or pre-signaled by higher layers.

The reordering queue(s) for which the modified MAC-ehs procedure applies may be signaled by higher layers along with (or as part of) the RRC command that triggers the MAC-ehs reset, if applicable. Alternatively, it may be pre-signaled upon setting up the logical channel mapped to the queue, or it may be pre-defined depending on the type of logical channel mapped to the queue, (e.g., it may be pre-defined that any queue mapped onto the CCCH logical channel undergoes the extended MAC-ehs reset procedure). The signaling can be performed using one of the options listed above.

The modified reordering functionality for the receiver operation is as follows:

When a MAC-hs PDU with TSN=SN is received:
If next_expected_TSN is NOT set to "Pending"
if SN is within the receiver window:
if SN<next_expected_TSN, or this MAC-hs PDU has previously been received:
the MAC-hs PDU shall be discarded;
else:
the MAC-hs PDU shall be placed in the reordering buffer at the place indicated by the TSN.
if SN is outside the receiver window:
the received MAC-hs PDU shall be placed above the highest received TSN in the reordering buffer, at the position indicated by SN;
RcvWindow_UpperEdge shall be set to SN thus advancing the receiver window;
any MAC-hs PDUs with TSN≤RcvWindow_UpperEdge−RECEIVE_WINDOW_SIZE, i.e. outside the receiver window after its position is updated, shall be removed from the reordering buffer and be delivered to the disassembly entity;
if next_expected_TSN is below the updated receiver window:
next_expected_TSN shall be set to:
RcvWindow_UpperEdge−RECEIVE_WINDOW_SIZE+1;
if the MAC-hs PDU with TSN=next_expected_TSN is stored in the reordering buffer:
all received MAC-hs PDUs with consecutive TSNs from next_expected_TSN (included) up to the first not received MAC-hs PDU shall be delivered to the disassembly entity;
next_expected_TSN shall be advanced to the TSN of this first not received MAC-hs PDU.
If a WTRU has insufficient memory to process a received MAC-ehs PDU, the WTRU performs the following operations:
select TSN_flush such that:
next_expected_TSN<TSN_flush≤RcvWindow_UpperEdge+1;
deliver all correctly received MAC-hs PDUs with TSN<TSN_flush to the disassembly entity;
if the MAC-hs PDU with TSN=TSN_flush has previously been received:
deliver all received MAC-hs PDUs with consecutive TSNs from TSN_flush (included) up to the first not received MAC-hs PDU to the disassembly entity;
advance next_expected_TSN to the TSN of this first not received MAC-hs PDU.
else:
set next_expected_TSN to TSN_flush.
ENDIF [next_expected_TSN is NOT set to "Pending"]
Else (e.g. if next_expected_TSN is set to "pending")
The T1 timer is not started
Next_expected_TSN is set to SN+1 (or alternatively, SN+x where x is pre-defined or set by higher layers)
RcvWindow_UpperEdge is set to TSN+y, where y may be pre-determined or pre-signaled by higher layers
END The reordering functionality may be modified such that two different timers (T_init and T1) may be used. When the reordering queue is in the "pending" state, the T1 timer used in the conventional procedure cannot be started. Thus, the conventional procedure needs to be modified in the following way.

If no timer T1 is active:
  the timer T1 shall be started when a reordering PDU with TSN>next_expected_TSN is correctly received, if next_expected_TSN is not set to pending (or if "reordering_state" is not set to pending);
  T1_TSN shall be set to the TSN of this MAC-hs PDU.

The second modification is that when the reordering queue is in the "pending" state, the variable "next_expected_TSN" is not updated or set and stays set to the value "pending". In addition, any comparison made with the variable "next_expected_TSN" in the conventional procedure should have the result "False" when the reordering queue is in the "pending" state. In case the MAC-ehs reset procedure sets the variable RcvWindow_UpperEdge to "pending", this variable needs to be initialized upon reception of the first reordering PDU. These modifications may be implemented, for instance, by modifying the conventional procedure. It should be understood that other formulations to the procedure are also possible.

Receiver Operation:
When a MAC-hs PDU with TSN=SN is received:
  (Optional, in case RcvWindow_UpperEdge" is set to "pending" during MAC-ehs reset) if the receiver window is "pending" (RcvWindow_UpperEdge set to "pending")
    RcvWindow_UpperEdge shall be set to SN
  if SN is within the receiver window:
    if next_expected_TSN is not set to "pending" and SN<next_expected_TSN, or this MAC-hs PDU has previously been received:
      the MAC-hs PDU shall be discarded;
    else:
      the MAC-hs PDU shall be placed in the reordering buffer at the place indicated by the TSN.
  if SN is outside the receiver window:
    the received MAC-hs PDU shall be placed above the highest received TSN in the reordering buffer, at the position indicated by SN;
    RcvWindow_UpperEdge shall be set to SN thus advancing the receiver window;
    any MAC-hs PDUs with:
  TSN≤RcvWindow_UpperEdge−RECEIVE_WINDOW_SIZE, i.e. outside the receiver window after its position is updated, shall be removed from the reordering buffer and be delivered to the disassembly entity;
    if next_expected_TSN is not set to "pending" and next_expected_TSN is below the updated receiver window:
      next_expected_TSN shall be set to RcvWindow_UpperEdge−RECEIVE_WINDOW_SIZE+1;
  if next_expected_TSN is not set to "pending" and the MAC-hs PDU with TSN=next_expected_TSN is stored in the reordering buffer:
    all received MAC-hs PDUs with consecutive TSNs from next_expected_TSN (included) up to the first not received MAC-hs PDU shall be delivered to the disassembly entity;
    next_expected_TSN shall be advanced to the TSN of this first not received MAC-hs PDU.

In case a WTRU has insufficient memory to process a received reordering PDU, the WTRU performs the following operations:
  select TSN_flush such that: next_expected_TSN<TSN_flush≤RcvWindow_UpperEdge+1 (or any value if next_expected_TSN is "pending");
  deliver all correctly received MAC-hs PDUs with TSN<TSN_flush to the disassembly entity;
  if the MAC-hs PDU with TSN=TSN_flush has previously been received:
    deliver all received MAC-hs PDUs with consecutive TSNs from TSN_flush (included) up to the first not received MAC-hs PDU to the disassembly entity;
    if next_expected_TSN is not set to "pending" advance next_expected_TSN to the TSN of this first not received MAC-hs PDU.
  else if next_expected_TSN is not set to "pending":
    set next_expected_TSN to TSN_flush.

The third modification specifies what is done while the reordering queue is in the "pending" state, (e.g., while the T_init timer is active, if this trigger has been selected). The following needs to be added to the conventional reordering procedure, (it should be understood that the variable Tinit_TSN may be substituted for T1_TSN without change of meaning):
  If next_expected_TSN is set to "pending" (or reordering_state is set to "pending") and a reordering PDU for the given queue is received with TSN=SN:
    (1) (Optional, applicable to the case where T_init is not immediately started upon MAC-ehs reset procedure.) If no timer T_init is active
      (a) T_init timer is started,
      (b) Tinit_TSN is set to SN.
    (2) (Optional, applicable to the case where T_init is immediately started upon MAC_ehs reset procedure.) If Tinit_TSN is set to "pending":
      (a) Tinit_TSN is set to SN.
  When T_init timer expires (or when reordering_state is reset to "normal" for whatever reason):
    (1) Optional, applicable to the case where T_init is immediately started upon MAC_ehs reset procedure. If Tinit_TSN is set to "pending":
      (a) Restart T_init timer.
    (2) If Tinit_TSN is not set to "pending":
      (a) All correctly received reordering PDUs up to and including Tinit_TSN−1 (or optionally Tinit_TSN) are delivered to the entity above reordering (i.e. can be an LCH-ID demultiplexer entity, disassembly, or reassembly entity).
      (b) All correctly received reordering PDUs up to the next not received reordering PDU with TSN greater than Tinit_TSN shall be delivered to the entity above reordering.
      (c) next_expected_TSN is set to the TSN of the next not received reordering PDU, optionally with TSN greater than T1_TSN; and (if applicable) reordering_state variable is set to "normal". Alternatively, the next_expected_TSN can always be set to the next not received MAC-ehs PDU with TSN greater than T1_TSN when the timer expires.
      (d) Optionally, if there still exist some received reordering PDUs that can not be delivered to higher layer:
        (i) timer T1 is started
        (ii) set T1_TSN to the highest TSN among those of the sets of MAC-ehs SDUs that can not be delivered Alternatively, if the reordering_state variable is used in the reordering procedure (optional), the next_expected_TSN may be to RcvWindow_UpperEdge−RECEIVE_WINDOW_SIZE+1 when a reordering PDU with TSN=SN is received.

Alternatively, a single timer (T1) may be used. If a single timer is used, (i.e., T1 timer), the reordering function is described as follows:

If no timer T1 is active and next_expected_TSN is not set to "Pending":
(a) the timer T1 shall be started when a reordering PDU with TSN>next_expected_TSN is correctly received.
(b) T1_TSN shall be set to the TSN of this reordering PDU.

If no timer T1 is active and next_expected_TSN is set to "Pending"
(c) the timer T1 shall be started when a reordering PDU is correctly received
(d) T1_TSN is set to the TSN of this reordering PDU.

If a timer T1 is already active:
(e) no additional timer shall be started, i.e. only one timer T1 may be active at a given time.

The timer T1 shall be stopped if:
(f) the reordering PDU with TSN=T1_TSN can be delivered to the reassembly entity before the timer expires and next_expected_TSN is not set to "Pending".

When the timer T1 expires and next_expected_TSN is not set to "Pending" and T1_TSN>next_expected_TSN:
(g) all correctly received reordering PDUs with TSN>next_expected_TSN up to and including T1_TSN−1 shall be delivered to the reassembly entity;
(h) all correctly received reordering PDUs up to the next not received reordering PDU shall be delivered to the reassembly entity.
(i) next_expected_TSN shall be set to the TSN of the next not received reordering PDU.

When the timer T1 expires and next_expected_TSN is set to "Pending"
(j) All correctly received reordering PDUs up to and including T1_TSN−1 are delivered to the reassembly entity
(k) All correctly received reordering PDUs up to the next not received reordering PDU with TSN greater than T1_TSN shall be delivered to the reassembly entity
(l) next_expected_TSN is set to the TSN of the next not received reordering PDU, optionally with TSN greater than T1_TSN When the timer T1 is stopped or expires, and there still exist some received reordering PDUs that can not be delivered to higher layer:
(m) timer T1 is started
(n) set T1_TSN to the highest TSN among those of the sets pf MAC-ehs SDUs that can not be delivered.

Alternatively, the following may be performed:
When the timer T1 expires and T1_TSN>next_expected_TSN or next_expected_TSN is set to "Pending":
(a) all correctly received reordering PDUs with TSN>next_expected_TSN up to and including T1_TSN−1 shall be delivered to the reassembly entity;
(b) all correctly received reordering PDUs up to the next not received reordering PDU shall be delivered to the reassembly entity.
(c) next_expected_TSN shall be set to the TSN of the next not received reordering PDU.

The receiver operation for reordering is described as follows:
When a reordering PDU with TSN=SN is received:
(a) if RcvWindow_UpperEdge is set to "Pending"
(i) RcvWindow_UpperEdge shall be set to SN
(b) if SN is within the receiver window:
(i) if next_expected_TSN is not set to "Pending" and if SN<next_expected_TSN, or this reordering PDU has previously been received:
(ii) the reordering PDU shall be discarded;
(c) else:
(i) the reordering PDU shall be placed in the reordering buffer at the place indicated by the TSN.
(d) if SN is outside the receiver window:
(i) the received reordering PDU shall be placed above the highest received TSN in the reordering buffer, at the position indicated by SN;
(ii) RcvWindow_UpperEdge shall be set to SN thus advancing the receiver window;
(iii) any reordering PDU with TSN RcvWindow_UpperEdge−RECEIVE_WINDOW_SIZE, i.e. outside the receiver window after its position is updated, shall be removed from the reordering buffer and be delivered to the reassembly entity;
(iv) if next_expected_TSN is not set to "pending" and if next_expected_TSN is below the updated receiver window:
a. next_expected_TSN shall be set to RcvWindow_UpperEdge−RECEIVE_WINDOW_SIZE+1;
(e) if next_expected_TSN is not set to "pending" and if the reordering PDU with TSN=next_expected_TSN is stored in the reordering buffer:
(i) all received reordering PDUs with consecutive TSNs from next_expected_TSN (included) up to the first not received reordering PDU shall be delivered to the reassembly entity;
(ii) next_expected_TSN shall be advanced to the TSN of this first not received reordering PDU.

In case a WTRU has insufficient memory to process a received reordering PDU, the WTRU performs the following operations:
(a) select TSN_flush such that: next_expected_TSN<TSN_flush≤RcvWindow_UpperEdge+1 [or any value if next_expected_TSN is set to "Pending"];
(b) deliver all correctly received reordering PDUs with TSN<TSN_flush to the reassembly entity;
(c) if the reordering PDU with TSN=TSN_flush has previously been received:
(i) deliver all received reordering PDUs with consecutive TSNs from TSN_flush (included) up to the first not received reordering PDU to the reassembly entity;
(ii) advance next_expected_TSN to the TSN of this first not received reordering PDU.
(d) else:
(i) set next_expected_TSN to TSN_flush.

In accordance with a seventh embodiment, the Node-Bs may broadcast the TSN for the next MAC-ehs SDU to be sent for the WTRUs using the common H-RNTI. This information may be broadcasted in one of the system information block (SIB) that is originated in the Node-B. When the WTRU performs a MAC-ehs reset and selects a new cell, the WTRU reads the SIB containing the TSN number. Upon acquiring the TSN, the WTRU may perform the following steps:

(1) Set next_expected_TSN=TSN+1 acquired from SIB; and (2) Set Rcv_Window_UpperEdge=TSN This enables the WTRU to properly process the next received MAC-ehs PDU using a common H-RNTI and perform reordering.

Alternatively, the Node-B may provide the TSN on the HS-SCCH. The TSN may be provided in one or a combination of the following ways:

(1) For every transmission over a common H-RNTI; and (2) Only for the first x (configurable amount of times) transmission after a WTRU has just been added to the new cell.

Alternatively, the Node B and the WTRU may reset the TSN of a particular queue to a default value. This may be performed whenever a packet is transmitted to a new WTRU in the cell. The default value may be signalled through higher layers or pre-defined. The Node B may signal the reset of the TSN to all other WTRUs that monitor the H-RNTI. The Node B may signal a TSN reset using any of the following methods:

(1) Using new or conventional Layer 3 signalling, (e.g., BCCH or another other RRC message);

(2) Using new or conventional Layer 2 signalling, (e.g., the MAC-ehs header may be modified to include TSN reset information); and (3) Using new or conventional PHY layer signalling, (e.g., a modified HS-SCCH format could be used to indicate a TSN reset.

In accordance with an eighth embodiment, the network always ensures that the RRC messages sent over common H-RNTI is small enough to fit into a single MAC-ehs PDU by minimizing the content of the message. The RRC message may be "segmented" into smaller RRC messages. For instance, the initial message may contain the cell RNTI (C-RNTI) and/or H-RNTI and the rest of the configuration may be signalled by using separate RRC message(s). After the WTRU gets its dedicated H-RNTI, subsequent RRC messages may be of any size since the reordering functionality at MAC-ehs works properly with the dedicated H-RNTI.

However, the network needs to ensure that the WTRU has successfully received the initial RRC message, (e.g., containing only the C-RNTI and/or H-RNTI), prior to sending subsequent messages (configuration) using the dedicated H-RNTI. This can be guaranteed if the RRC entity waits conservatively enough by taking into account the number of HARQ retransmission and the RRC delay requirements in the WTRU. Depending on the implementation, the RRC entity may be "blind" to the delay required by the lower layers to transmit the message. If this is the case then the RRC needs to wait for a long time to be sure that the transmission is completed.

Additionally, when segmenting the RRC message, an RNC has to ensure that the size of the generated MAC-ehs SDUs is within a value such that no segmentation is required at the MAC-ehs entity. Smallest transport block size available may be used as a reference of the MAC-ehs PDU size. Alternatively, or in combination, the transport block size that is going to be used by the Node B may be inferred from the value of the received measurement results on a random access channel (RACH) that is included in the "Transmit Power Level" field.

If segmentation of the RRC message occurs, the receiver side may need to be modified such that it acts on the IEs of the received message as if a single RRC message was sent, (i.e., do not wait for the other part or segment of the RRC message).

In accordance with a ninth embodiment, the first received packets are not delivered immediately. The first received MAC_ehs PDU is always placed in the reordering buffer and its SN is used to determine the values of some or all of the reordering variables (next_expected_TSN, RcvWindow_UpperEdge, T1_TSN). For instance, the upper edge of the receiver window (RcvWindow_UpperEdge) and/or T1_TSN may be set to the SN of the received MAC-ehs PDU, and next_expected_TSN may be set to this SN-RECEIVE_WINDOW_SIZE+1. This ensures that any subsequently received PDU with lower TSN is not discarded, but rather is properly stored in the reordering buffer. Alternatively, next_expected_TSN may be set to a different value, such as RcvWindow_UpperEdge-x where x is some predefined constant. A timer (either T1 timer or some other timer T1_init) is started upon reception of this first MAC-ehs PDU. Until expiration of the timer, all subsequently received MAC-ehs PDUs are placed in the reordering buffer according to their TSN. These PDUs are not delivered to the reassembly entity unless they have to be removed from the reordering buffer as per the conventional procedure.

When the timer expires, some or all of the PDUs present in the reordering buffer may be delivered to the reassembly entity. For instance, all PDUs with TSN up to including T1_TSN−1 may be delivered, and then, all PDUs up to the next not received PDU may be delivered. The variable next_expected_TSN may be set (or reset) to the TSN of this next not received PDU. In addition, the T1 timer may be restarted at this point if there are still PDUs that cannot be delivered. In this case, the variable T1_TSN may be set to the highest TSN among those of the MAC-ehs PDUs that cannot be delivered. Normal reordering operation proceeds from that point.

At least one of the variables next_expected_TSN and RcvWindow_UpperEdge has its initial value set to a special value ("Pending") so that the WTRU executes the proper operations at the beginning of the procedure. Alternatively, a new Boolean variable, (e.g., "Reordering_InitialState") may be defined to indicate whether the procedure is in its initial state or not. When the value of this variable is set to "True", the WTRU executes the procedure as stated above, and the variable is reset to "False" at the expiration of the initial timer.

In accordance with one option for the ninth embodiment, the variable RcvWindow_UpperEdge only has its initial value set to "Pending" for certain reordering queues subject to the modified procedure. The T1 timer is started upon reception of the first PDU when the value of RcvWindow_UpperEdge is "Pending" indicating that it is in its initial state. The detailed procedure is as follows:

If no timer T1 is active:

the timer T1 shall be started when a reordering PDU with TSN>next_expected_TSN is correctly received, or when a reordering PDU is correctly received and RcvWindow_UpperEdge is set to "Pending".

T1_TSN shall be set to the TSN of this reordering PDU.

If a timer T1 is already active:

no additional timer shall be started, i.e. only one timer T1 may be active at a given time.

The timer T1 shall be stopped if:
  the reordering PDU with TSN=T1_TSN can be delivered to the reassembly entity before the timer expires.
When the timer T1 expires and T1_TSN>next_expected_TSN:
  all correctly received reordering PDUs with TSN>next_expected_TSN up to and including T1_TSN−1 shall be delivered to the reassembly entity;
  all correctly received reordering PDUs up to the next not received reordering PDU shall be delivered to the reassembly entity.
  next_expected_TSN shall be set to the TSN of the next not received reordering PDU.
When the timer T1 is stopped or expires, and there still exist some received reordering PDUs that can not be delivered to higher layer:
  timer T1 is started
  set T1_TSN to the highest TSN among those of the sets of MAC-ehs SDUs that can not be delivered.
Transmitter Operation:
After the transmitter has transmitted a reordering PDU with TSN=SN, any reordering PDU with TSN≤SN−TRANSMIT_WINDOW_SIZE should not be retransmitted to avoid sequence number ambiguity in the receiver.
Receiver Operation:
When a reordering PDU with TSN=SN is received:
  if RcvWindow_UpperEdge is set to "Pending":
    RcvWindow_UpperEdge shall be set to SN;
    next_expected_TSN shall be set to RcvWindow_UpperEdge−WINDOW_SIZE+1.
  if SN is within the receiver window:
    if SN<next_expected_TSN, or this reordering PDU has previously been received:
      the reordering PDU shall be discarded;
    else:
      the reordering PDU shall be placed in the reordering buffer at the place indicated by the TSN.
  if SN is outside the receiver window:
    the received reordering PDU shall be placed above the highest received TSN in the reordering buffer, at the position indicated by SN;
    RcvWindow_UpperEdge shall be set to SN thus advancing the receiver window;
    any reordering PDU with TSN≤RcvWindow_UpperEdge−RECEIVE_WINDOW_SIZE, i.e. outside the receiver window after its position is updated, shall be removed from the reordering buffer and be delivered to the reassembly entity;
    if next_expected_TSN is below the updated receiver window:
      next_expected_TSN shall be set to RcvWindow_UpperEdge−RECEIVE_WINDOW_SIZE+1;
    if the reordering PDU with TSN=next_expected_TSN is stored in the reordering buffer:
      all received reordering PDUs with consecutive TSNs from next_expected_TSN (included) up to the first not received reordering PDU shall be delivered to the reassembly entity;
      next_expected_TSN shall be advanced to the TSN of this first not received reordering PDU.
In case a WTRU has insufficient memory to process a received reordering PDU, it shall perform the following set of operations:
  select TSN_flush such that: next_expected_TSN<TSN_flush≤RcvWindow_UpperEdge+1;
  deliver all correctly received reordering PDUs with TSN<TSN_flush to the reassembly entity;
  if the reordering PDU with TSN=TSN_flush has previously been received:
    deliver all received reordering PDUs with consecutive TSNs from TSN_flush (included) up to the first not received reordering PDU to the reassembly entity;
    advance next_expected_TSN to the TSN of this first not received reordering PDU.
  else:
    set next_expected_TSN to TSN_flush.

In accordance with a second option for the ninth embodiment, the variables next_expected_TSN and RcvWindow_UpperEdge both have their initial values set to "Pending" for certain reordering queues subject to the modified procedure. Upon reception of the first PDU the variables RcvWindow_UpperEdge and T1_TSN are set to the SN of this PDU, while next_expected_TSN remains set to the value "Pending". In addition, the timer T1 is started. Comparison between the SN of the received PDUs and next_expected_TSN is skipped when next_expected_TSN is set to "Pending". After the timer T1 expires or is stopped (the latter may happen if the PDU with SN equal to T1_TSN may be delivered due to the advancing receiver window), all PDUs with SN up to T1_TSN−1, and with SN up to the next not received PDU, are delivered to the reassembly entity. The value of next_expected_TSN is set to the SN of the next not received PDU and normal reordering operation can proceed from that point. The detailed procedure is as follows:

If no timer T1 is active and next_expected_TSN is not set to "Pending":
  the timer T1 shall be started when a reordering PDU with TSN>next_expected_TSN is correctly received.
  T1_TSN shall be set to the TSN of this reordering PDU.
If no timer T1 is active and next_expected_TSN is set to "Pending":
  the timer T1 shall be started when a reordering PDU is correctly received
  T1_TSN is set to the TSN of this reordering PDU.
If a timer T1 is already active:
  no additional timer shall be started, i.e. only one timer T1 may be active at a given time.
The timer T1 shall be stopped if:
  the reordering PDU with TSN=T1_TSN can be delivered to the reassembly entity before the timer expires.
When the timer T1 expires and next_expected_TSN is not set to "Pending" and T1_TSN>next_expected_TSN:
  all correctly received reordering PDUs with TSN>next_expected_TSN up to and including T1_TSN−1 shall be delivered to the reassembly entity;
  all correctly received reordering PDUs up to the next not received reordering PDU shall be delivered to the reassembly entity.
  next_expected_TSN shall be set to the TSN of the next not received reordering PDU.
When the timer T1 is stopped or expires and next_expected_TSN is set to "Pending":
  All correctly received reordering PDUs up to and including T1_TSN−1 are delivered to the reassembly entity.
  All correctly received reordering PDUs up to the next not received reordering PDU with TSN greater than T1_TSN shall be delivered to the reassembly entity.
  next_expected_TSN is set to the TSN of the next not received reordering PDU with TSN greater than T1_TSN.

When the timer T1 is stopped or expires, and there still exist some received reordering PDUs that can not be delivered to higher layer:
    timer T1 is started
    set T1_TSN to the highest TSN among those of the sets pf MAC-ehs SDUs that can not be delivered.
Transmitter Operation:
After the transmitter has transmitted a reordering PDU with TSN=SN, any reordering PDU with TSN≤SN−TRANSMIT_WINDOW_SIZE should not be retransmitted to avoid sequence number ambiguity in the receiver.
Receiver Operation:
When a reordering PDU with TSN=SN is received:
    if RcvWindow_UpperEdge is set to "Pending":
        RcvWindow_UpperEdge shall be set to SN.
    if SN is within the receiver window:
        if next_expected_TSN is not set to "Pending" and SN<next_expected_TSN, or this reordering PDU has previously been received:
            the reordering PDU shall be discarded;
        else:
            the reordering PDU shall be placed in the reordering buffer at the place indicated by the TSN.
    if SN is outside the receiver window:
        the received reordering PDU shall be placed above the highest received TSN in the reordering buffer, at the position indicated by SN;
        RcvWindow_UpperEdge shall be set to SN thus advancing the receiver window;
        any reordering PDU with TSN≤RcvWindow_UpperEdge−RECEIVE_WINDOW_SIZE, i.e. outside the receiver window after its position is updated, shall be removed from the reordering buffer and be delivered to the reassembly entity;
        if next_expected_TSN is not set to "Pending" and next_expected_TSN is below the updated receiver window:
            next_expected_TSN shall be set to RcvWindow_UpperEdge−RECEIVE_WINDOW_SIZE+1;
    if next_expected_TSN is not set to "Pending" and the reordering PDU with TSN=next_expected_TSN is stored in the reordering buffer:
        all received reordering PDUs with consecutive TSNs from next_expected_TSN (included) up to the first not received reordering PDU shall be delivered to the reassembly entity;
        next_expected_TSN shall be advanced to the TSN of this first not received reordering PDU.
In case a WTRU has insufficient memory to process a received reordering PDU, it shall perform the following set of operations:
    select TSN_flush such that:
        next_expected_TSN<TSN_flush≤RcvWindow_UpperEdge+1, or (in case next_expected_TSN is set to "Pending"), RcvWindow_UpperEdge−RECEIVE_WINDOW_SIZE<TSN_flush≤RcvWindow_UpperEdge+1;
    deliver all correctly received reordering PDUs with TSN<TSN_flush to the reassembly entity;
    if the reordering PDU with TSN=TSN_flush has previously been received:
        deliver all received reordering PDUs with consecutive TSNs from TSN_flush (included) up to the first not received reordering PDU to the reassembly entity;
        advance next_expected_TSN to the TSN of this first not received reordering PDU.
    else:
        set next_expected_TSN to TSN_flush.

In accordance with a third option for the ninth embodiment, RcvWindow_UpperEdge and next_expected_TSN keep their initial values as in the conventional art, and a new variable "Reordering_InitialState" is defined and takes the initial value "True" for those reordering queues subject to the modified procedure. The condition for starting the T1 timer is modified to ensure that the timer is started upon reception of the first PDU when the value of Reordering_InitialState is "True" indicating that it is in its initial state. The WTRU first checks whether Reordering_InitialState is set to "True" before handling the received MAC-ehs PDU. If this is the case, the variable RcvWindow_UpperEdge is set to the SN of the PDU, the variable next_expected_TSN is set to the lower edge of the receiver window and the variable Reordering_InitialState is set to "False" to return to the normal state. The detailed procedure is as follows:
If no timer T1 is active:
    the timer T1 shall be started when a reordering PDU with TSN>next_expected_TSN is correctly received, or when a reordering PDU is correctly received and Reordering_InitialState is set to "True".
    T1_TSN shall be set to the TSN of this reordering PDU.
If a timer T1 is already active:
    no additional timer shall be started, i.e. only one timer T1 may be active at a given time.
The timer T1 shall be stopped if:
    the reordering PDU with TSN=T1_TSN can be delivered to the reassembly entity before the timer expires.
When the timer T1 expires and T1_TSN>next_expected_TSN:
    all correctly received reordering PDUs with TSN>next_expected_TSN up to and including T1_TSN−1 shall be delivered to the reassembly entity;
    all correctly received reordering PDUs up to the next not received reordering PDU shall be delivered to the reassembly entity.
    next_expected_TSN shall be set to the TSN of the next not received reordering PDU.
When the timer T1 is stopped or expires, and there still exist some received reordering PDUs that can not be delivered to higher layer:
    timer T1 is started
    set T1_TSN to the highest TSN among those of the sets pf MAC-ehs SDUs that can not be delivered.
Transmitter Operation:
After the transmitter has transmitted a reordering PDU with TSN=SN, any reordering PDU with TSN≤SN−TRANSMIT_WINDOW_SIZE should not be retransmitted to avoid sequence number ambiguity in the receiver.
Receiver Operation:
When a reordering PDU with TSN=SN is received:
    if Reordering_InitialState is set to "True":
        RcvWindow_UpperEdge shall be set to SN;
        Reordering_InitialState shall be set to "False";
        next_expected_TSN shall be set to RcvWindow_UpperEdge−WINDOW_SIZE+1.
    if SN is within the receiver window:
        if SN<next_expected_TSN, or this reordering PDU has previously been received:
            the reordering PDU shall be discarded;
        else:
            the reordering PDU shall be placed in the reordering buffer at the place indicated by the TSN.

if SN is outside the receiver window:
   the received reordering PDU shall be placed above the highest received TSN in the reordering buffer, at the position indicated by SN;
   RcvWindow_UpperEdge shall be set to SN thus advancing the receiver window;
   any reordering PDU with TSN≤RcvWindow_UpperEdge-RECEIVE_WINDOW_SIZE, i.e. outside the receiver window after its position is updated, shall be removed from the reordering buffer and be delivered to the reassembly entity;
   if next_expected_TSN is below the updated receiver window:
      next_expected_TSN shall be set to RcvWindow_UpperEdge-RECEIVE_WINDOW_SIZE+1;
if the reordering PDU with TSN=next_expected_TSN is stored in the reordering buffer:
   all received reordering PDUs with consecutive TSNs from next_expected_TSN (included) up to the first not received reordering PDU shall be delivered to the reassembly entity;
   next_expected_TSN shall be advanced to the TSN of this first not received reordering PDU.

In case a WTRU has insufficient memory to process a received reordering PDU, it shall perform the following set of operations:
   select TSN_flush such that: next_expected_TSN<TSN_flush≤RcvWindow_UpperEdge+1;
   deliver all correctly received reordering PDUs with TSN<TSN_flush to the reassembly entity;
   if the reordering PDU with TSN=TSN_flush has previously been received:
      deliver all received reordering PDUs with consecutive TSNs from TSN_flush (included) up to the first not received reordering PDU to the reassembly entity;
      advance next_expected_TSN to the TSN of this first not received reordering PDU.
   else:
      set next_expected_TSN to TSN_flush.

In accordance with a fourth option for the ninth embodiment, the reordering functionality may start with an initial window size, (i.e., RECEIVE_WINDOW_SIZE), of 64, which spans all the possible sequence numbers for the queue. This will ensure that during the initial phase no reordering PDUs are discarded. Upon reception of the first reordering PDU, the T1 timer is started with T1_TSN set to the SN of the first received MAC-ehs PDU, unless reordering PDU with SN set to 0 is received.

When the timer expires, some or all of the PDUs present in the reordering buffer are delivered to the reassembly entity according to the following rules:
   (1) All PDUs with TSN up to including T1_TSN−1 shall be delivered to higher layers;
   (2) All PDUs up to the next not received PDU shall be delivered to higher layers;
   (3) next_expected_TSN may be set to the TSN of the next not received PDU (alternatively, specify set it to the next not received PDU with TSN greater than T1_TSN);
   (4) The RcvWindow_UpperEdge is set to the highest sequence number of a reordering PDU received; and
   (5) The RECEIVE_WINDOW_SIZE variable is restored and set to the configured normal operation value.

In addition, the T1 timer may be restarted at this point if there are still PDUs that cannot be delivered. In this case, the variable T1_TSN is set to the highest TSN among those of the MAC-ehs PDUs that cannot be delivered. Normal reordering operation proceeds from that point.

It should also be noted that for all the options 1 through 4, a separate new timer may optionally be introduced, (i.e., T1 init), for the initial phase. In order to utilize a separate timer the paragraph of the procedure where it is checked "If no timer T1 is active:" is modified as follows:
   If no timer T1 or T1 init is active:
      If RcvWindow_UpperEdge (or next_expected_TSN) is not set to "Pending" (or optionally Reordering_InitialState is set to "FALSE"), the timer T1 shall be started when a reordering PDU with TSN>next_expected_TSN or is correctly received.
      If RcvWindow_UpperEdge (or next_expected_TSN) is set to "Pending" (or optionally if Reordering_InitialState is set to "TRUE"), the timer T1 init shall be started when a reordering is correctly received.

All other actions related to the stopping and expiration of the timer remain similar to the actions related to T1 timer. When T1 init timer expires, the reordering entity must ensure that T1 timer is restarted if there are still PDUs that cannot be delivered. These changes are highlighted in the following:
If a timer T1 or T1 init is already active:
   no additional timer shall be started, i.e. only one timer T1 (or T1 init) may be active at a given time.
The timer T1 or T1 init shall be stopped if:
   the reordering PDU with TSN=T1_TSN can be delivered to the reassembly entity before the timer expires.
When the timer T1 or T1 init expires and T1_TSN>next_expected_TSN:
   all correctly received reordering PDUs with TSN>next_expected_TSN up to and including T1_TSN−1 shall be delivered to the reassembly entity;
   all correctly received reordering PDUs up to the next not received reordering PDU shall be delivered to the reassembly entity.
   next_expected_TSN shall be set to the TSN of the next not received reordering PDU.
When the timer T1 or T1 init is stopped or expires, and there still exist some received reordering PDUs that can not be delivered to higher layer:
   timer T1 is started
   set T1_TSN to the highest TSN among those of the sets pf MAC-ehs SDUs that can not be delivered.

In accordance with a tenth embodiment, an explicit systematic setting of the initial T1 timer upon reception of the first reordering PDU may be avoided. For example, the first reordering PDU may be immediately delivered to higher layers and the value of its SN is used to determine the values of some of the reordering variables. In order to achieve this one or a combination of the following options may be used:
   In accordance with a first option, the procedure starts in an "initial" state using one of the methods disclosed above, (e.g., next_expected_TSN and/or RcvWindow_UpperEdge is initialized to "Pending", or a new variable is defined for the initial state). When the first reordering PDU is received, next_expected_TSN is set to SN+1 and RcvWindow_UpperEdge is set to SN. The reordering queue continues the normal mode of operation for all subsequently received reordering PDUs.

The first option may result in subsequently received PDUs with SN<next_expected_TSN being discarded. In order to avoid discarding of PDUs, in accordance with a second option, a new initial_TSN variable is maintained that contains the TSN number of the first received PDU. The first received PDU is delivered to higher layers and Initial_TSN is set to SN, next_expected_TSN is set to SN+1, and RcvWindow_UpperEdge is set to SN.

Reordering PDUs with SN<initial_TSN may not be discarded until the lower edge of the window, (i.e., RcvWindow_UpperEdge-RECEIVE_WINDOW_SIZE), has moved past the value of the initial_TSN. All reordering PDUs with SN<initial_TSN may be immediately delivered to the reassembly entity or directly to LCH-ID demux entity (without performing the reassembly). Reordering PDUs with SN>initial_TSN may be normally processed by the reordering procedure. Optionally, in order to avoid duplication of data a list of received PDUs can be maintained until the lower edge of the window has moved past the initial_TSN. Alternatively, the reordering PDUs SN<initial_TSN may not be discarded (and are delivered to higher layers) until a certain timer expires (T1 or a new timer).

An example procedure is described below.

If no timer T1 is active:
 the timer T1 shall be started when a reordering PDU with TSN>next_expected_TSN is correctly received.
 T1_TSN shall be set to the TSN of this reordering PDU.
If a timer T1 is already active:
 no additional timer shall be started, (i.e., only one timer T1 may be active at a given time).
The timer T1 shall be stopped if:
 the reordering PDU with TSN=T1_TSN can be delivered to the reassembly entity before the timer expires.
When the timer T1 expires and T1_TSN>next_expected_TSN:
 all correctly received reordering PDUs with TSN>next_expected_TSN up to and including T1_TSN-1 shall be delivered to the reassembly entity;
 all correctly received reordering PDUs up to the next not received reordering PDU shall be delivered to the reassembly entity.
 next_expected_TSN shall be set to the TSN of the next not received reordering PDU.
 if reordering InitState is set to "TRUE", reordering InitState shall be set to "FALSE"
When the timer T1 is stopped or expires, and there still exist some received reordering PDUs that can not be delivered to higher layer:
 timer T1 is started
 set T1_TSN to the highest TSN among those of the sets pf MAC-ehs SDUs that can not be delivered.
Transmitter Operation:
After the transmitter has transmitted a reordering PDU with TSN=SN, any reordering PDU with TSN≤SN-TRANSMIT_WINDOW_SIZE should not be retransmitted to avoid sequence number ambiguity in the receiver.
Receiver Operation:
When a reordering PDU with TSN=SN is received:
 If initial_TSN is set to "Pending"
  RcvWindow_UpperEdge shall be set to SN;
  next_expected_TSN shall be set to SN+1
  initial_TSN shall be set to SN
  deliver the reordering PDU to reassembly entity
 if SN is within the receiver window
  if reordering State is set to "TRUE" and if SN<initial_TSN
   the reordering PDU shall be sent to the reassembly entity (or optionally it can bypass reassembly entity and be sent directly to LCH-ID demux entity)
  else if reordering InitState if set to "FALSE" and if SN<next_expected_TSN, or this reordering PDU has previously been received:
   the reordering PDU shall be discarded;
  else:
   the reordering PDU shall be placed in the reordering buffer at the place indicated by the TSN.
 if SN is outside the receiver window:
  the received reordering PDU shall be placed above the highest received TSN in the reordering buffer, at the position indicated by SN;
  RcvWindow_UpperEdge shall be set to SN thus advancing the receiver window;
  any reordering PDU with TSN≤RcvWindow_UpperEdge-RECEIVE_WINDOW_SIZE, i.e. outside the receiver window after its position is updated, shall be removed from the reordering buffer and be delivered to the reassembly entity;
  if initial_TSN is below the updated receiver window reordering InitState is set to "FALSE"
  if next_expected_TSN is below the updated receiver window:
   next_expected_TSN shall be set to RcvWindow_UpperEdge-RECEIVE_WINDOW_SIZE+1;

Alternatively, upon reception of first received reordering PDU, next_expected_TSN may be set to SN-x, where x can be a static value, a configurable number by higher layers, or a predetermined value based on the number of HARQ processes, (e.g., if only 4 HARQ processes are used, x may be set to 4 or may be the number of HARQ processes-1). The RcvWindow_UpperEdge is set to SN. This ensures that some of reordering PDUs with SN<SN-x will not be discarded for the initial procedure.

Alternatively, the initial value of next_expected_TSN may be set the lower edge of the initial window, RcvWindow_UpperEdge-RECEIVE_WINDOW_SIZE+1 instead of being set to 0 as in the prior art. The initial value of RcvWindow_UpperEdge may be set to 63.

In addition, the reordering procedure may be modified by means of changing the initial window size. For example, two receiver window sizes may be configured, a small initial receiver window size and a normal operation receiver window configured by higher layers. The initial window size may be set to a smaller value to speed up the initial process and avoid waiting for long T1 timer to expire. In order to return to the normal state of reordering operation the WTRU may wait for n (n corresponds to the small initial window size) consecutive reordering PDUs to be received, or for the lower edge of the window to move past the SN of the initial received PDU, or for a timer to expire. When entering the normal operation the normal configured WINDOW_SIZE may be configured and restored.

The window size may also be set to a value of zero or one. With the value set to one, the probability of receiving the first PDU within the window and thus discarding it is significantly reduced. The WTRU may be configured such that the receive window is initially set to this small value and upon reception of the first PDU the receive window is set back to the configured RECEIVE_WINDOW_SIZE.

In accordance with an eleventh embodiment, the reordering entity may use the HARQ process information as an indication to start the normal reordering operation. This method may be used alone or in a combination with any embodiments described herein. During initial operation, the WTRU may ensure that the reordering PDU with the lowest possible sequence is received from the cell, when all the HARQ processes have a new assignment. All received reordering PDUs are stored in the reordering buffer until either all new HARQ processes have a new assignment or until the T1 timer expires.

The NDI bit of each HARQ process may be monitored. When the NDI bit for all active processes toggles from '0' to '1' (indicating a new transmission on the HARQ process), the reordering entity may deliver all stored PDU up to and including the first received reordering PDU to the reassembly entity. All other PDUs up to the first not received PDU above the first received PDU may also be delivered to higher layer. Next_expected_TSN may be set to SN of the first not received PDU and the RcvWindow_UpperEdge is set to the SN of the highest received TSN. T1 timer should be stopped if it is running.

Alternatively, a mapping between the HARQ process and possible TSN values may be maintained. When at least one reordering PDU from every HARQ process is successfully received, or has failed to be received successfully, the WTRU has ensured that no other reordering PDUs with sequence numbers lower than any of the ones received will be transmitted. The WTRU may set the RcvWindow_UpperEdge to the SN of the highest received TSN and next_expected_TSN to the first not received PDU with SN higher than the lowest received reordering PDU.

In another option, when the WTRU receives the first reordering PDU, the WTRU may check the TSN of all PDUs in all active HARQ processes. If the sequence numbers of the PDUs being processed in the HARQ process are higher than the first PDU received, the WTRU may resume normal operation. Otherwise, the WTRU may wait until the reordering PDU with the lowest sequence number in the HARQ processes is received.

The network may also define the relationship between the HARQ process ID and a set of possible TSNs for each HARQ process. For instance, it may be configured that HARQ process #m would only handle PDUs with TSN that satisfy TSN=4 n+m, where n is an integer. This relationship may be pre-signaled to the WTRU by higher layers. The WTRU may then use this relationship to deduce when the lowest SN PDU is received and thus resume normal operation.

One may envision a network based solution that restricts the use of the full TSN number space, (i.e., the network avoids using TSN 55 to 63). If the receive window size is equal to or less than the TSNs not used by the network, this will eliminate the probability of discarding the first PDUs received. However, this solution may lead to additional delays and the possibility of delivering PDUs out of order. In order to avoid this, the following options may be implemented.

In accordance with a first option, the WTRU may use a modulo x, where x is the lowest TSN number restricted, (i.e., if 55 to 63 are restricted, x will be 55), for all arithmetic operations of the reordering entity. For example, all arithmetic operations contained in the reordering procedure on next_expected_TSN, RcvWindow_UpperEdge, T1_TSN and TSN_flush are affected by the x modulus.

The x modulus may affect the operations at all times for reordering of CCCH or DCCH (SRB#1). For the initial operation, the RcvWindow_UpperEdge may be 63 or any other value above x. The modulo x should not be applied to this initial value of RcvWindow_UpperEdge or the initial value may be considered as an undefined initial value. Using this value may be considered as equivalent to setting to the value of RcvWindow_UpperEdge to "Pending". When the RcvWindow_UpperEdge is set to 63, upon reception of the first PDU with TSN=SN, one or a combination of the following operations may be performed:

(1) Start using modulo x for all arithmetic operations;
(2) RcvWindow_UpperEdge shall be set to SN;
(3) next_expected_TSN shall be set to RcvWindow_UpperEdge−WINDOW_SIZE+1; and
(4) Start T1 timer or T1_init timer.

Alternatively, two different modulo operations may be used for the initial and normal state of operation. For example, for the initial state of operation the normal modulo 64 may be used. The initial RcvWindow_UpperEdge is set to 63, the lower edge of the window is within the restricted TSNs and thus no data will be discarded. However, when entering normal operation state, (i.e., upon reception of the first PDU or when T1 timer expires), the reordering procedure may update the arithmetic procedures based on the modulo x operation. This will avoid duplicate T1 delays. Optionally, the four steps described above of setting RcvWindow_UpperEdge, next_expected_TSN, T1, and start of using modulo x, may also be performed.

In accordance with a second option, modulo 64 is used at all times but the procedure is modified such that it takes into consideration the missing TSN space. One of the above mentioned methods may be used to indicate the reordering state operation, (i.e., either initial or normal reordering state):

next_expected_TSN or RcvWindow_UpperEdge set to a special value, "Pending"; and
new state variable.

The WTRU enters normal state of reordering operation either when the first PDU is received or when T1 timer expires. For the initial state of operation the arithmetic procedures remain unchanged. Since the TSN space is restricted, the first PDU received will never be within the receive window and thus it will not be discarded. However, when entering normal state the reordering procedure must be updated in order to avoid out of order delivery and duplicate T1 timers. For the purpose of describing this procedures the following variables will be used:

TSN space will be restricted from x to y, where x is the lower value of the restricted space and y is the upper value of the restricted space, (i.e., 63);
RcvWindow_lowerEdge is equivalent to RcvWindow_UpperEdge−RECEIVE_WINDOW_SIZE+1;
Nr_restrictedTSNs is equivalent to the number of TSNs that are restricted from being used, y-x.

When operating in normal state the reordering procedure is modified such that:

When x<=RcvWindow_lowerEdge<=y, then the receiver window defined is equivalent to RcvWindow_lowerEdge−Nr_restrictedTSNs;
Else the receive window is calculated as (RcvWindow_UpperEdge−RECEIVE_WINDOW_SIZE+1);
next_expected_TSN should not be set to a value between x and y;
If next_expected_TSN is x−1, then next in order MAC-ehs PDU to be expected is considered to be y+1;
The reordering procedure may consider all TSN numbers from x to y as successfully received PDUs when performing reordering and when it is considered to be waiting for those TSNs Optionally, upon reception of the first PDU the variables may be set the following way:

(1) RcvWindow_UpperEdge shall be set to SN;
(2) next_expected_TSN shall be set to RcvWindow_UpperEdge−WINDOW_SIZE+1; and
(3) Start T1 timer or T1 init timer.

In accordance with a twelfth embodiment, the reordering problem may be solved on the network side, instead of the receiver side. The Node B may maintain different TSN numbers for each WTRU independently within each common H-RNTI. When a new WTRU is added to the cell, the Node B may start numbering the reordering PDUs for this WTRU from zero. The TSN numbers are incremented for each WTRU independently. This solution would require the Node B to know the unique WTRU ID to which it is transmitting in addition to the common H-RNTI. The Iub frame protocol may provide the common H-RNTI. In this embodiment the dedicated H-RNTI that the network has provided for this WTRU should also be provided.

Alternatively, the RNC may provide an indication that the message to be transmitted is for a new WTRU. When the Node B receives this indication the Node B may perform one or a combination of the following:

Reset TSN numbers associated with the common H-RNTI group right away; or

Ensure that any previously buffered MAC-ehs PDUs with the same common H-RNTI have been transmitted and then reset the TSN numbers, such that the message for the new WTRU is sent with the initial_TSN to zero.

Since the other WTRUs associated to the cell with the same common H-RNTI will be receiving the data for the new cell, it might be preferable to indicate to these WTRUs that the TSN number has been reset. This can be indicated by a bit in the HS-SCCH.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for a wireless transmit/receive unit (WTRU) to process data, the method comprising:

receiving data via a high speed downlink shared channel (HS-DSCH), wherein the data comprises an HS-DSCH medium access control (MAC-ehs) protocol data unit (PDU), and wherein the MAC-ehs PDU comprises a reordering PDU; and sending the data to a next processing entity without performing reordering of reordering PDUs if a condition has been met, wherein the sending bypasses a reordering entity, and wherein the next processing entity is a demultiplexing entity.

2. The method of claim 1, wherein the WTRU is in one of a Cell_FACH state, a Cell_PCH state, or a URA_PCH state.

3. The method of claim 1, wherein each MAC-ehs PDU is received more than once and each MAC-ehs PDU retransmission is completed before starting reception of a subsequent MAC-ehs PDU.

4. The method of claim 1, wherein the condition has been met if the data is from a certain priority queue.

5. The method of claim 1, wherein the condition has been met if the received MAC-ehs PDU is associated with a common HS-DSCH radio network temporary identity (H-RNTI).

6. The method of claim 1, wherein the condition has been met if the data is from a certain logical channel.

7. The method of claim 6, wherein the certain logical channel is one of a broadcast control channel (BCCH) or a paging control channel (PCCH).

8. The method of claim 1, wherein the received MAC-ehs PDU is received while the WTRU is in one of a Cell_FACH state, Cell_PCH state, or URA_PCH state, and further comprising setting an initial value of a next_expected_TSN to a lower edge of a receive window (RcvWindow_UpperEdge−RECEIVE_WINDOW_SIZE+1).

9. A wireless transmit/receive unit (WTRU) comprising:
a transceiver; and
a processor configured to:
receive data via a high speed downlink shared channel (HS-DSCH), wherein the data comprises an HS-DSCH medium access control (MAC-ehs) protocol data unit (PDU), and wherein the MAC-ehs PDU comprises a reordering PDU; and
send the data to a next processing entity without performing reordering of reordering PDUs if a condition has been met, wherein the sending bypasses a reordering entity, and wherein the next processing entity is a demultiplexing entity.

10. The WTRU of claim 9, wherein the WTRU is in one of a Cell_FACH state, a Cell_PCH state, or a URA_PCH state.

11. The WTRU of claim 9, wherein each MAC-ehs PDU is transmitted more than once and each MAC-ehs PDU retransmission is completed before starting transmission of a subsequent MAC-ehs PDU.

12. The WTRU of claim 9, wherein the condition has been met if the data is from a certain priority queue.

13. The WTRU of claim 9, wherein the condition has been met if the received MAC-ehs PDU is associated with a common HS-DSCH radio network temporary identity (H-RNTI).

14. The WTRU of claim 9, wherein the condition has been met if the data is from a certain logical channel.

15. The WTRU of claim 14, wherein the certain logical channel is one of a broadcast control channel (BCCH) or a paging control channel (PCCH).

16. The WTRU of claim 9, wherein the received MAC-ehs PDU is received while the (WTRU) is in one of a Cell_FACH state, Cell_PCH state, or URA_PCH state, and further comprising setting an initial value of a next_expected_TSN to a lower edge of a receive window (RcvWindow_UpperEdge−RECEIVE_WINDOW_SIZE+1).

* * * * *